US010065514B2

(12) United States Patent
Yuasa

(10) Patent No.: US 10,065,514 B2
(45) Date of Patent: Sep. 4, 2018

(54) POWER TRANSFER SYSTEM

(71) Applicant: TOYOTA JIDOSHA KABUSHIKI KAISHA, Toyota-shi, Aichi-ken (JP)

(72) Inventor: Hiroaki Yuasa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 223 days.

(21) Appl. No.: 15/048,313

(22) Filed: Feb. 19, 2016

(65) Prior Publication Data
US 2016/0250935 A1 Sep. 1, 2016

(30) Foreign Application Priority Data

Feb. 27, 2015 (JP) ................. 2015-038993

(51) Int. Cl.
*B60L 1/00* (2006.01)
*B60L 3/00* (2006.01)
*H02G 3/00* (2006.01)
*B60L 11/18* (2006.01)

(52) U.S. Cl.
CPC ......... *B60L 11/182* (2013.01); *B60L 11/1829* (2013.01); *B60L 2230/00* (2013.01); *B60L 2240/36* (2013.01); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/14* (2013.01)

(58) Field of Classification Search
CPC B60L 11/182; B60L 2230/00; B60L 11/1829; B60L 2240/36; Y02T 10/7005
See application file for complete search history.

(56) References Cited

U.S. PATENT DOCUMENTS

| 5,573,090 | A | * | 11/1996 | Ross ................. B60L 5/005 |
| | | | | 180/2.1 |
| 7,741,734 | B2 | | 6/2010 | Joannopoulos et al. |
| 8,466,654 | B2 | * | 6/2013 | Cook ................. B60L 11/182 |
| | | | | 320/104 |
| 8,823,551 | B1 | | 9/2014 | Hoffman |
| 2007/0222542 | A1 | | 9/2007 | Joannopoulos et al. |
| 2008/0278264 | A1 | | 11/2008 | Karalis et al. |
| 2009/0195332 | A1 | | 8/2009 | Joannopoulos et al. |
| 2009/0195333 | A1 | | 8/2009 | Joannopoulos et al. |

(Continued)

FOREIGN PATENT DOCUMENTS

| AU | 2006269374 B2 | 1/2007 |
| AU | 2006269374 C1 | 1/2007 |

(Continued)

*Primary Examiner* — Jared Fureman
*Assistant Examiner* — Esayas Yeshaw
(74) *Attorney, Agent, or Firm* — Oliff PLC

(57) ABSTRACT

A power transfer system includes a power reception coil arranged on a bottom surface of a vehicle, a plurality of members arranged along the bottom surface, a plurality of temperature detectors arranged around the power reception coil, and a controller that causes the power to be transmitted from a power transmission coil to decrease when a detection temperature of any of the plurality of temperature detectors is equal to or higher than a prescribed threshold, the prescribed value being set lower for a temperature detector of the plurality of temperature detectors provided closer to a member having a lower heat resistance.

6 Claims, 28 Drawing Sheets

(56) References Cited

U.S. PATENT DOCUMENTS

| | | | |
|---|---|---|---|
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0264745 A1 | 10/2010 | Karalis et al. | |
| 2012/0203410 A1* | 8/2012 | Wechlin | B60L 11/182 701/22 |
| 2013/0127409 A1 | 5/2013 | Ichikawa | |
| 2013/0193749 A1 | 8/2013 | Nakamura et al. | |
| 2014/0002016 A1* | 1/2014 | Bachmaier | B60L 11/182 320/108 |
| 2014/0021914 A1* | 1/2014 | Martin | H02H 5/045 320/109 |
| 2014/0217966 A1 | 8/2014 | Schneider et al. | |
| 2015/0028809 A1* | 1/2015 | Nishikawa | H02J 7/0088 320/109 |
| 2015/0137801 A1* | 5/2015 | Raedy | H02J 7/025 324/207.15 |
| 2015/0179067 A1* | 6/2015 | Thun | E01C 11/24 340/905 |
| 2015/0244202 A1* | 8/2015 | Laifenfeld | H02J 7/025 320/108 |
| 2016/0052403 A1* | 2/2016 | Asai | H02J 17/00 307/10.1 |
| 2016/0114687 A1* | 4/2016 | Ichikawa | B60L 5/005 701/22 |
| 2016/0121735 A1* | 5/2016 | Sugano | B60L 11/1818 320/109 |
| 2016/0134162 A1* | 5/2016 | Koizumi | H02J 7/025 307/9.1 |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A | 12/2009 |
| EP | 2555379 A1 | 2/2013 |
| IN | 735/DELNP/2008 | 5/2008 |
| IN | 6195/DELNP/2009 | 7/2010 |
| JP | 2009-501510 A | 1/2009 |
| JP | 2013-126327 | 5/2013 |
| JP | 2013-110822 A | 6/2013 |
| JP | 2013-135572 A | 7/2013 |
| JP | 2013-146148 A | 7/2013 |
| JP | 2013-146154 A | 7/2013 |
| JP | 2013-154815 A | 8/2013 |
| KR | 2008-0031398 A | 4/2008 |
| KR | 2010-0015954 A | 2/2010 |
| WO | 2007/008646 A2 | 1/2007 |
| WO | 2008/118178 A1 | 10/2008 |
| WO | 2013/108108 A2 | 7/2013 |

\* cited by examiner

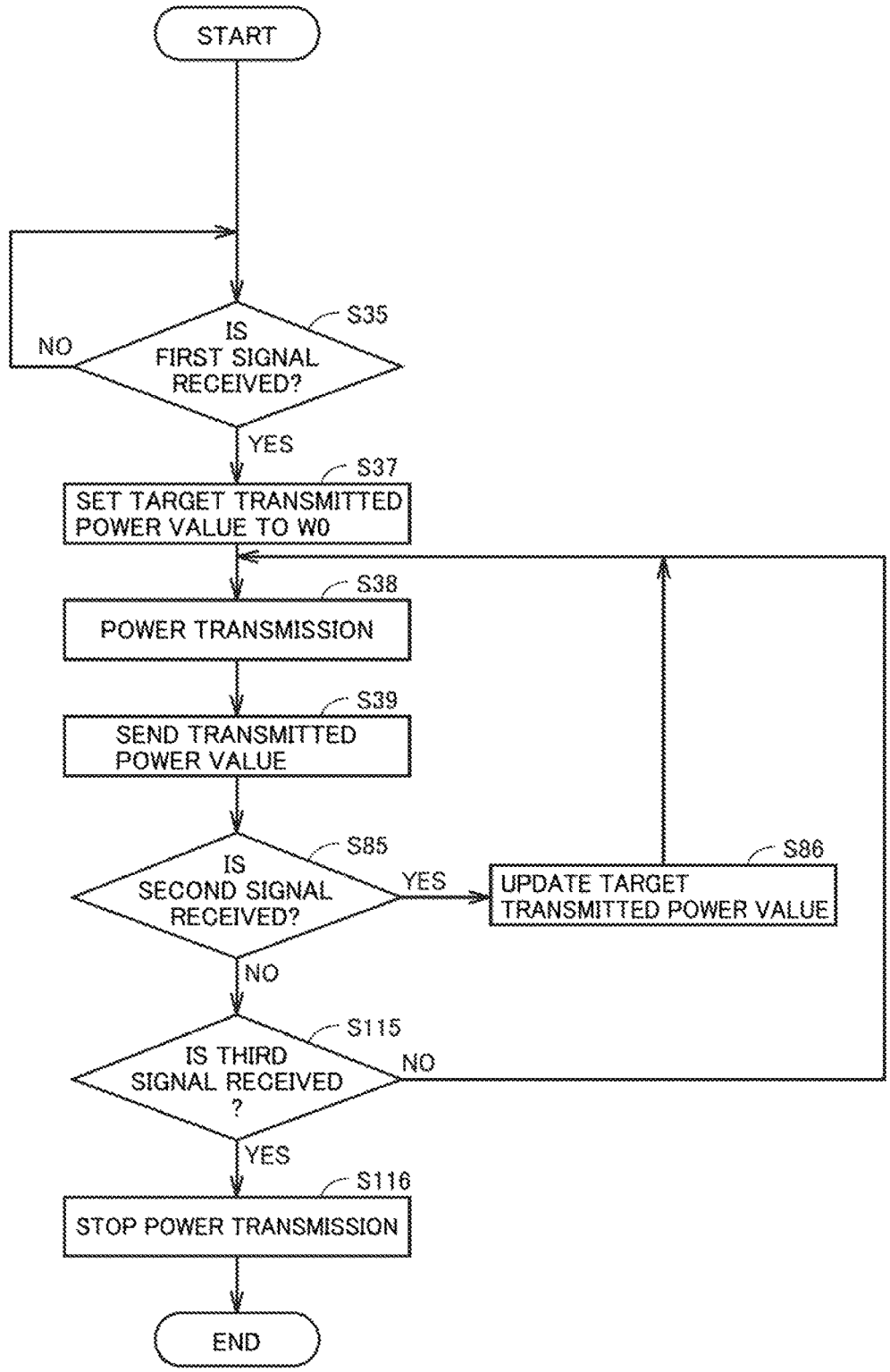

POWER TRANSFER SYSTEM

This nonprovisional application is based on Japanese Patent Application No. 2015-038993 filed on Feb. 27, 2015 with the Japan Patent Office, the entire contents of which are hereby incorporated by reference.

BACKGROUND

Technical Field

The present disclosure relates to a power transfer system.

Description of Background Art

Contactless power transfer systems have been previously proposed in which power is transmitted to a power reception coil provided on a bottom surface of a vehicle from a power transmission coil of a power transmission device (see Japanese Patent Laid-Open Nos. 2013-154815, 2013-146154, 2013-146148, 2013-110822, and 2013-126327).

The power transfer system described in Japanese Patent Laid-Open No. 2013-135572 includes a control device that estimates, based on power reception efficiency of a power reception unit, a temperature of an electric device connected to the power reception unit.

SUMMARY

In the power transfer system as described above, depending on the stopped position of the vehicle, power may be transmitted to the power reception coil from the power transmission coil, with a central position of the power reception coil being displaced from a central position of the power transmission coil when the power reception coil is viewed from the power transmission coil. If power is transmitted with the power transmission coil and the power reception coil being displaced from each other, the amount of magnetic flux emitted from the power transmission coil into members around the power reception coil such as a floor panel and the like may increase to cause the temperature of the floor panel and the like to increase. If the temperature of the floor panel and the like increases, the temperature of each of various members mounted in contact with the floor panel and the like may exceed a heat-resistant temperature.

Moreover, an increased amount of magnetic flux may enter some members around the power reception coil, which may cause the temperature of each of these members to increase over the heat-resistant temperature. In the conventional art described above, however, no measures have been taken against this problem.

Thus, in order to prevent the temperature of each member around the power reception coil from exceeding the heat-resistant temperature when the power transmission coil is displaced relative to the power reception coil, it is possible to reduce the power to be transmitted in accordance with the amount of displacement.

In some cases, however, there may be no member having a temperature that exceeds the heat-resistant temperature even if the power reception coil is displaced relative to the power transmission coil, depending on the heat-resistant temperature of the member mounted on the floor panel, the range (location) where the member is mounted, the direction in which the power reception coil is displaced relative to the power transmission coil, and the distance of displacement. As a result, if the power to be transmitted is uniformly reduced based on the amount of displacement between the power transmission coil and the power reception coil, the power to be transmitted may be unnecessarily lowered even though there is no member having a temperature that exceeds the heat-resistant temperature. This may lead to a drawback such as an extended charging time, for example.

The embodiments were made in view of the problem described above, and an object is to provide a power transfer system that can prevent, during power transfer from the power transmission coil to the power reception coil, the temperature of each of the members around the power reception coil from exceeding the heat-resistant temperature, and can eliminate a drawback such as an extended charging time, for example.

A power transfer system includes a power reception coil provided on a bottom surface of a vehicle, a power transmission coil that contactlessly transmits power to the power reception coil, a plurality of members mounted along the bottom surface of the vehicle around the power reception coil, a plurality of temperature detectors, each of which detects a detection temperature that increases as a temperature of each of the plurality of members increases, and a controller that causes the power to be transmitted from the power transmission coil to decrease when the detection temperature detected by any of the plurality of temperature detectors is equal to or higher than a prescribed threshold.

At least one of the plurality of members is a heated member that increases in temperature by magnetic flux emitted from the power transmission coil. The heated member is located in a displacement direction spaced from an axis of the power reception coil.

The plurality of temperature detectors are arranged in a plurality of positions around the axis of the power reception coil.

A value of the prescribed threshold is set lower for a temperature detector associated with the heated member having lower heat resistance than for a temperature detector associated with one of the plurality of members other than the heated member and having a higher heat resistance than the heated member.

In the power transfer system, when the power reception coil is displaced relative to the power transmission coil in the direction in which the heated member having lower heat resistance is provided, the amount of incoming magnetic flux from the power transmission coil into the heated member having lower heat resistance increases. Similarly, the detection temperature of the temperature detector arranged toward the heated member also increases. Because the prescribed threshold of this temperature detector is lower, the power to be transmitted from the power transmission coil is reduced before the heated member having lower heat resistance is heated to a high temperature. Because the power to be transmitted is thus reduced, the temperature of the heated member having lower heat resistance can be prevented from exceeding the heat-resistant temperature.

Moreover, if the detection temperature of none of the temperature detectors exceeds the prescribed threshold value, power transmission is continued without reducing the power to be transmitted. Therefore, a drawback such as an extended charging time, for example, can be prevented.

As used herein, the expression "a plurality of temperature detectors" includes both a temperature detector provided on a member for directly detecting an increase in the temperature of the member and a temperature detector provided in a position distant from a member for indirectly detecting an increase in the temperature of the member.

As used herein, the expression "a heated member" that will be heated by magnetic flux emitted from the power transmission coil" includes both a member that will be directly heated by the magnetic flux emitted into the member from the power transmission coil and a member that will be heated by the heat transferred from a member on which the member is mounted, which has been heated to a high temperature by the magnetic flux emitted into the member.

As used herein, the term "heat resistance" refers to the extent of how unlikely the temperature of the member is to reach the heat-resistant temperature during a period from the time when power transmission from the power transmission coil to the power reception coil is started, with the central axis of the power reception coil and the central axis of the power transmission coil being horizontally displaced from each other, to the time when the power transmission is completed. A heated member having lower heat resistance and a heated member having higher heat resistance are now specifically described. It is assumed that the heated member having lower heat resistance is located in a first displacement direction relative to the power reception coil, and the heated member having higher heat resistance is located in a second displacement direction relative to the power reception coil.

With regard to the heated member having lower heat resistance, if power transmission from the power transmission coil to the power reception coil is started in a position where the central axis of the power reception coil is horizontally displaced in the first displacement direction relative to the central axis of the power transmission coil, the temperature of the heated member having lower heat resistance exceeds its heat-resistant temperature during a period from the start to the completion of the power transmission, when a distance of the displacement direction between the power reception coil and the power transmission coil is equal to or greater than a first distance.

With regard to the heated member having higher heat resistance, if power transmission from the power transmission coil to the power reception coil is started in a position where the central axis of the power reception coil is horizontally displaced in the second displacement direction relative to the central axis of the power transmission coil, the temperature of the heated member having higher heat resistance exceeds its heat-resistant temperature during a period from the start to the completion of the power transmission, when a distance of the displacement direction between the power reception coil and the power transmission coil is equal to or greater than a second distance.

The first distance of the "heated member having lower heat resistance" is shorter than the second distance of the "heated member having higher heat resistance". Therefore, even if power is transmitted from the power transmission coil to the power reception coil with the power reception coil being displaced relative to the power transmission coil, the temperature of the heated member having higher heat resistance is more unlikely to reach the heat-resistant temperature than the temperature of the heated member having lower heat resistance.

For example, the heated member having lower heat resistant temperature may be unlikely to reach its heat-resistant temperature when it is located distant from the power reception coil, and the heated member having higher heat resistant temperature may likely reach its heat-resistant temperature when it is located closer to the power reception coil.

The foregoing and other objects, features, aspects and advantages will become more apparent from the following detailed description when taken in conjunction with the accompanying drawings.

BRIEF DESCRIPTION OF THE DRAWINGS

FIG. 40 is a flowchart showing a control flow performed by a control unit 28.

DESCRIPTION OF PREFERRED EMBODIMENTS

Figure 1:
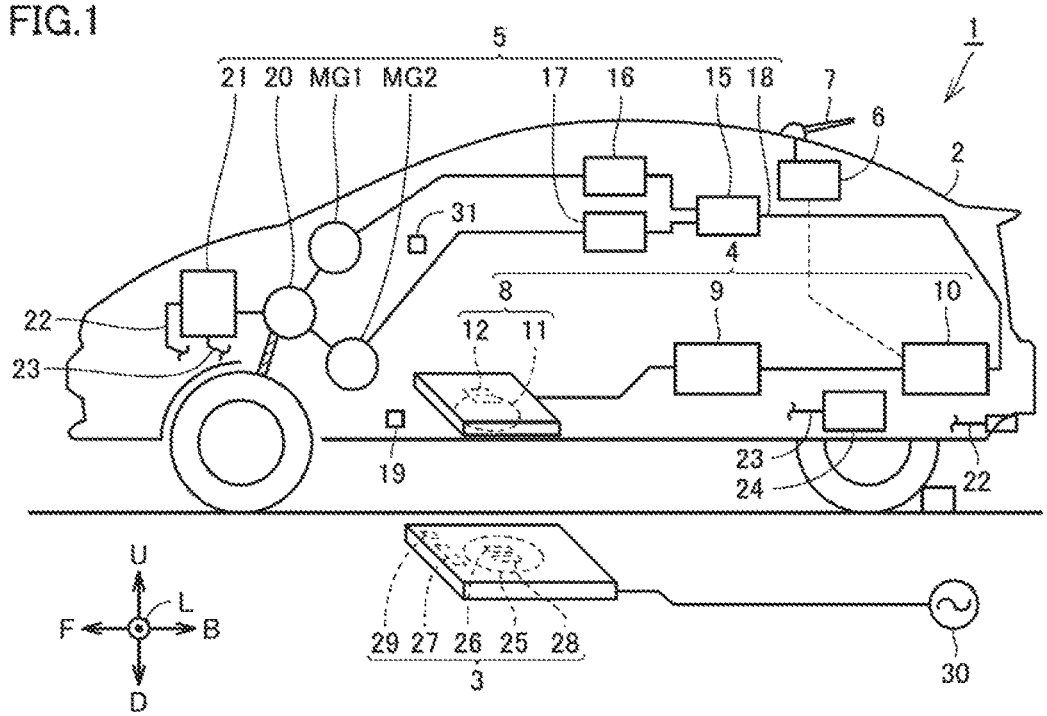
FIG. 1 is a schematic diagram schematically showing a power transfer system 1.
Figure 2:
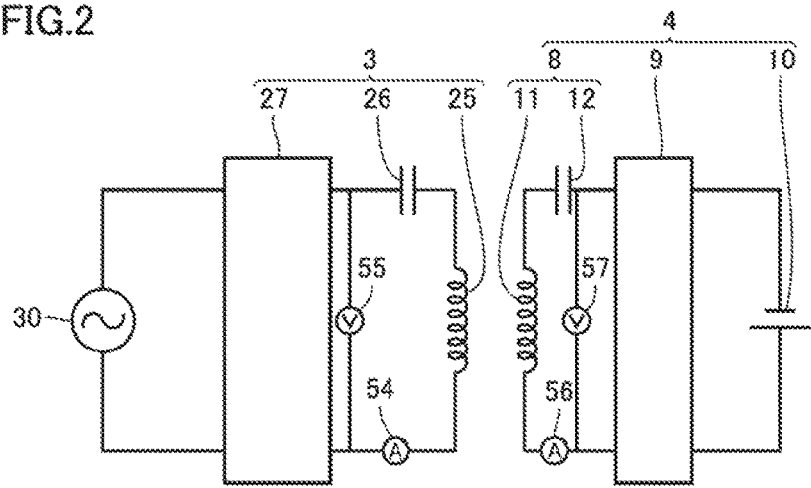
FIG. 2 is a circuit diagram schematically showing the power transfer system 1.

FIG. 1 is a schematic diagram schematically showing power transfer system 1, and FIG. 2 is a circuit diagram schematically showing power transfer system 1. As shown in FIGS. 1 and 2, power transfer system 1 includes power transmission device 3 and vehicle 2 including a power reception unit 4.

Vehicle 2 includes power reception unit 4 that receives power from power transmission device 3, a hybrid system 5, control unit 6, a communication unit 7, a vehicle height sensor 19, and a contactless charging button 31.

Power reception unit 4 includes power reception device 8 that contactlessly receives power from power transmission device 3, a rectifier 9 that converts AC power received by power reception device 8 into DC power and adjusts voltage, and a battery 10 supplied with the DC power from rectifier 9. Power reception device 8 includes power reception coil 11 and a capacitor 12 which are connected to rectifier 9.

Hybrid system 5 includes a converter 15 connected to battery 10, a wire harness 18 that connects converter 15 and battery 10, inverters 16, 17 connected to converter 15, a rotating electric machine MG1 connected to inverter 16, a rotating electric machine MG2 connected to inverter 17, an engine 21, and a power split device 20. Engine 21 is connected with an exhaust pipe unit 22 and a fuel pipe 23. A fuel pipe 23 is connected to a fuel tank 24.

Power transmission device 3 includes a frequency converter 27 connected to an AC power supply 30, power transmission coil 25 and a capacitor 26 connected to frequency converter 27, control unit 28 that controls frequency converter 27, and a communication unit 29 that communicates with communication unit 7.

Note that in FIG. 1, an upward direction U represents a vertically upward direction, and a downward direction D represents a vertically downward direction. Forward direction F represents a forward direction of vehicle 2, and backward direction B represents a backward direction of vehicle 2. A left direction L represents a left direction to a driver within vehicle 2. Note that a right direction R described below is the right direction to the driver within vehicle 2. Thus, a right side surface (first side surface) of vehicle 2 is located toward right direction R of vehicle 2, and a left side surface (second side surface) of vehicle 2 is located toward left direction L of vehicle 2.

In FIG. 2, a series LC resonant circuit is formed by power transmission coil 25 and capacitor 26 of power transmission device 3, and a series LC resonant circuit is formed by power reception coil 11 and capacitor 12 of power reception device 8. The series LC resonant circuit of power transmission device 3 and the series LC resonant circuit of power reception device 8 have the same or substantially the same resonance frequency. Note that power transmission device 3 and power reception unit 4 both have a Q value of equal to or greater than 100. Power can be transferred with high efficiency between power reception device 8 and power transmission device 3, because the resonance frequency of each of the resonant circuits is set as described above, and the Q value of each of power transmission device 3 and power reception unit 4 is set high.

Note that power transmission device 3 includes a voltage sensor 55, and a current sensor 54 provided between frequency converter 27 and capacitor 26. Voltage sensor 55 is connected to a wire between frequency converter 27 and capacitor 26, and to a wire between power transmission coil 25 and frequency converter 27. Voltage sensor 55 detects a voltage applied to power transmission coil 25, and current sensor 54 detects a current flowing through power transmission coil 25.

Power reception unit 4 includes a voltage sensor 57, and a current sensor 56 provided between rectifier 9 and capacitor 12. Voltage sensor 57 is connected to a wire between capacitor 12 and rectifier 9, and to a wire between power reception coil 11 and rectifier 9. Voltage sensor 57 detects a voltage applied to power reception coil 11, and current sensor 56 detects a current flowing through power reception coil 11.

Figure 3:
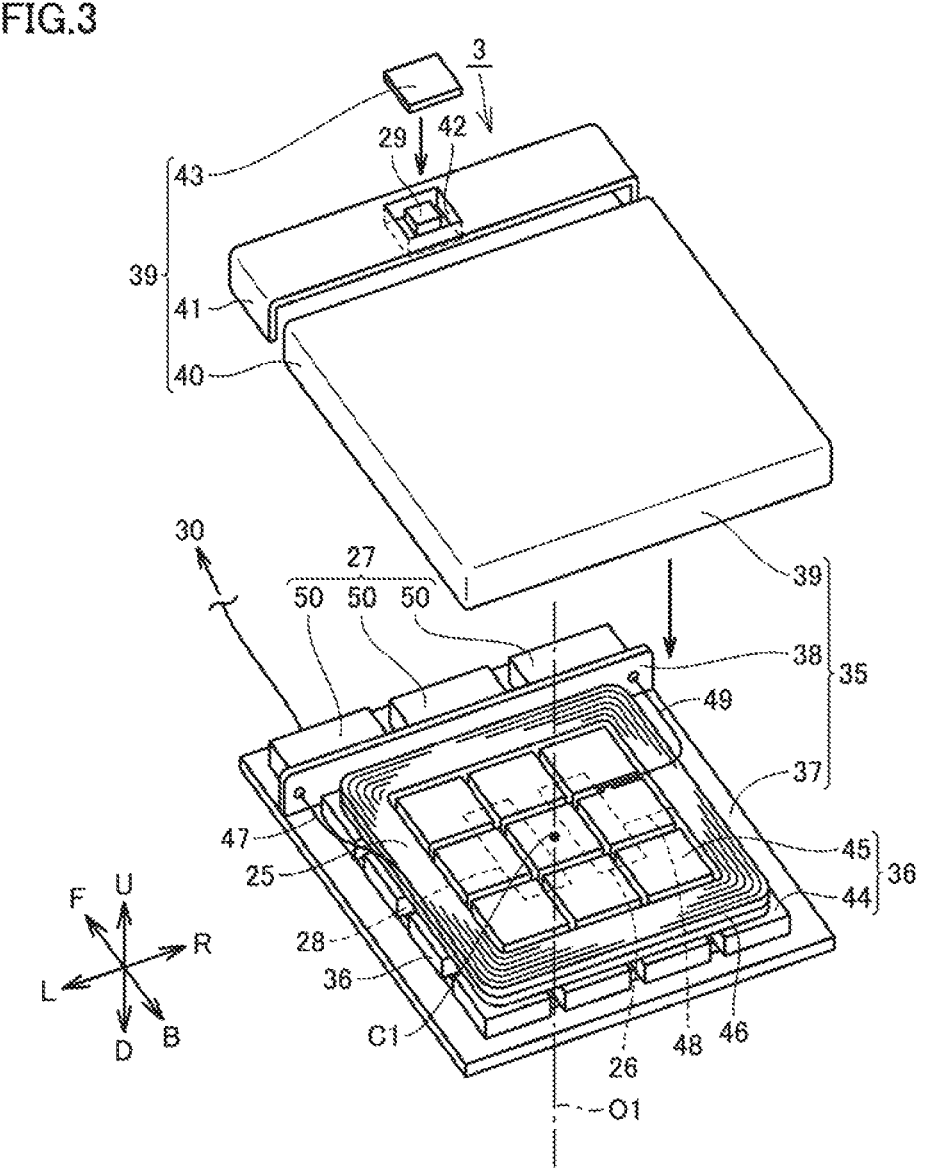
FIG. 3 is an exploded perspective view showing a power transmission device 3 when viewed from above.

FIG. 3 is an exploded perspective view showing power transmission device 3 when viewed from above. As shown in FIG. 3, power transmission device 3 includes a case 35; power transmission coil 25, capacitor 26, and frequency converter 27 accommodated within case 35; control unit 28 accommodated within case 35; ferrite 36 on which power transmission coil 25 is loaded; and communication unit 29.

Case 35 includes a metallic base plate 37 arranged on the ground, a metallic partition plate 38 provided on base plate 37, and a cover 39. Cover 39 includes a resin cover 40, a metallic cover 41 having a recess 42 formed in its upper surface, and a resin plate 43 that closes the opening of recess 42.

When resin cover 40 is placed over base plate 37, space is formed in which power transmission coil 25, capacitor 26, control unit 28, and ferrite 36 are accommodated. When metallic cover 41 is placed over base plate 37, space is formed in which frequency converter 27 is accommodated. Partition plate 38 serves as a partition between the space in which frequency converter 27 is accommodated and the space in which power transmission coil 25 and the like are accommodated. Recess 42 formed in metallic cover 41 is open upward. Within recess 42, communication unit 29 is accommodated. The opening of recess 42 is closed with resin plate 43. Because resin plate 43 is formed of resin, communication unit 29 can communicate with communication unit 7.

Ferrite 36 includes an outer peripheral annular core 44 formed by arranging a plurality of divided ferrite portions in an annular form, and a central core 45 arranged within an inner peripheral edge of outer peripheral annular core 44. Central core 45 is also formed by a plurality of divided ferrite portions, and is arranged to close the opening of outer peripheral annular core 44. Space is formed between central core 45 and base plate 37. Control unit 28 and capacitor 26 are accommodated within this space.

Power transmission coil 25 is formed by winding a coil wire 46 around a winding axis O1. Power transmission coil 25 is arranged on an upper surface of outer peripheral annular core 44, and is arranged to surround central core 45. A planar coil is adopted as power transmission coil 25. Power transmission coil 25 is arranged such that winding axis O1 extends vertically. Note that a central position C1 corresponds to a central position of power transmission coil 25, through which winding axis O1 passes.

Power transmission coil 25 has one end connected to a connection wire 47 connected to frequency converter 27, and the other end connected to a connection wire 48 connected to capacitor 26. Capacitor 26 is also connected with a connection wire 49 connected to frequency converter 27. Note that frequency converter 27 is configured to include a plurality of high voltage elements 50.

Figure 4:
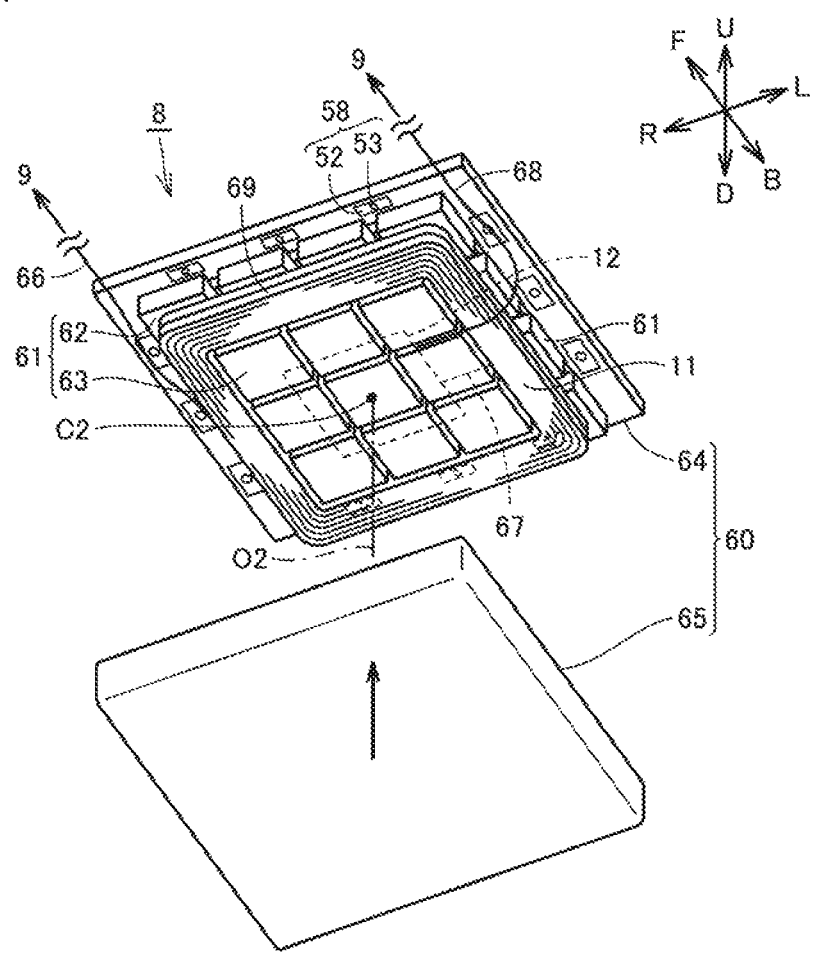
FIG. 4 is an exploded perspective view showing a power reception device 8 when viewed upward from below.

FIG. 4 is an exploded perspective view showing power reception device 8 when viewed from below. Thus, left direction L in FIG. 3 and left direction L in FIG. 4 are opposite directions on the sheets, and similarly, right direction R in FIG. 3 and right direction R in FIG. 4 are opposite directions on the sheets. Power reception device 8 includes a case 60; power reception coil 11, capacitor 12, and ferrite 61 accommodated within case 60; and a plurality of temperature detection devices 58 arranged around power reception coil 11. Each of temperature detection devices 58 includes a metal piece 52 and a temperature sensor 53 mounted on metal piece 52. Because each temperature detection device 58 is accommodated within case 60 of power reception device 8, temperature detection device 58 can be protected from direct contact with external foreign matter while vehicle 2 is running, for example.

When it is assumed that temperature detection devices 58 are arranged on a lower surface of a floor panel 70, for example, it will be necessary to protect temperature detection devices 58, as well as wires and the like connected to temperature detection devices 58, from external obstacles.

Case 60 includes a base plate 64 arranged below the floor panel of the vehicle, and a resin cover 65 arranged to cover base plate 64 from the bottom. When base plate 64 is placed into resin cover 65, space is formed in which power reception coil 11 and the like are accommodated.

Ferrite 61 includes an outer peripheral annular core 62 formed by arranging a plurality of divided ferrite portions in an annular form, and a central core 63 arranged within an inner peripheral edge of outer peripheral annular core 62. Central core 63 is formed by a plurality of divided ferrite portions, and is formed to protrude downward from outer peripheral annular core 62. Space is formed between central core 63 and base plate 64. Capacitor 12 is arranged within this space.

Power reception coil 11 is arranged on a lower surface of outer peripheral annular core 62. Power reception coil 11 is formed by winding a coil wire 69 around central core 63. Power reception coil 11 is formed by winding coil wire 69 around a winding axis O2, and a planar coil is adopted as power reception coil 11. Note that power reception coil 11 is arranged such that winding axis O2 is vertically directed. Note that a central position C2 corresponds to a central position of power reception coil 11, through which winding axis O2 passes.

Power reception coil 11 has one end connected to a connection wire 66 connected to rectifier 9, and the other end connected to a connection wire 67 connected to capacitor 12. Capacitor 12 is also connected with a connection wire 68 connected to rectifier 9.

Figure 5:
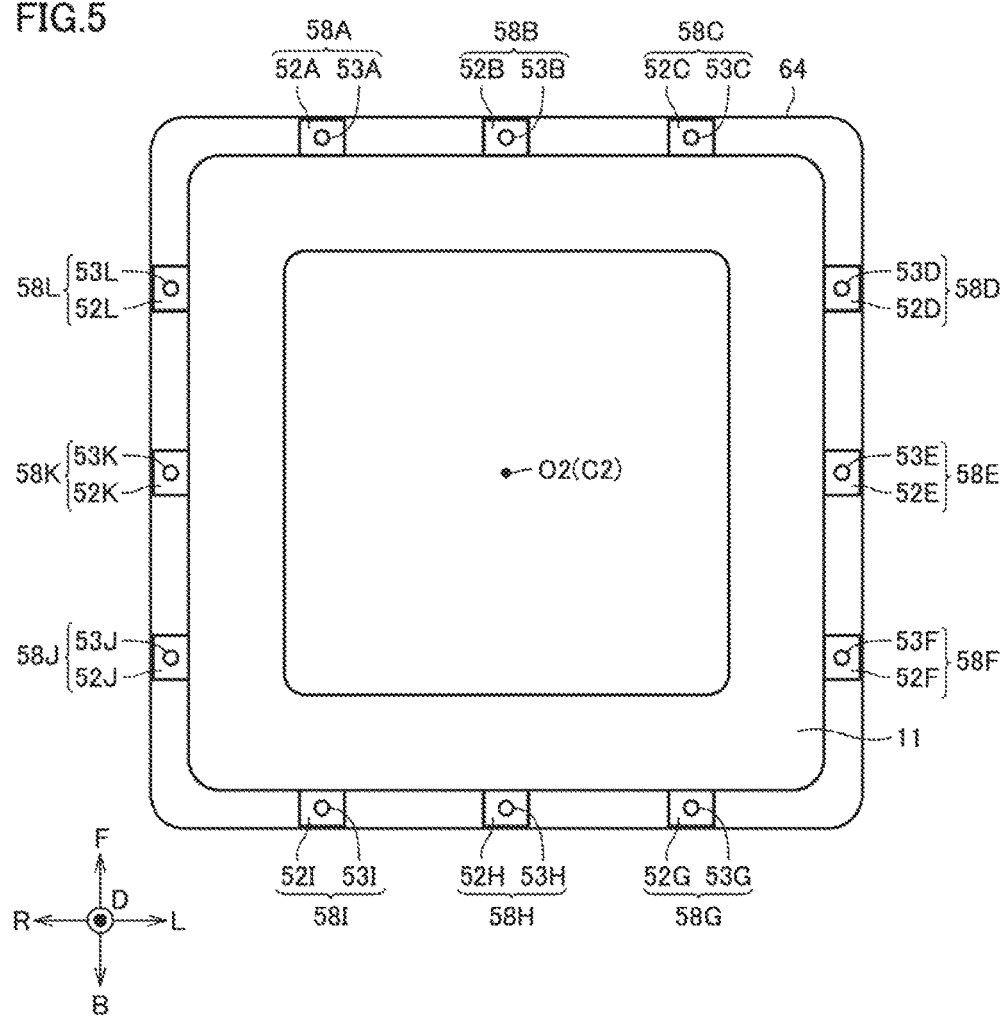
FIG. 5 is a plan view of a power reception coil 11 and members around power reception coil 11 when viewed in the direction of the arrow shown in FIG. 4.

FIG. 5 is a plan view of power reception coil 11 and members around power reception coil 11 when viewed in the direction of the arrow shown in FIG. 4.

As shown in FIG. 5, power reception coil 11 has a square outer shape. Temperature detection devices 58A-58L include metal pieces 52A-52L, respectively, and also include temperature sensors 53A-53L, respectively. Temperature sensors 53A-53L are provided on metal pieces 52A-52L, respectively, and measure a temperature of metal pieces 52A-52L, respectively.

Temperature detection devices 58A, 58B, and 58C are arranged on a side of forward direction F relative to power reception coil 11, and are arranged at a distance from one another along an outer periphery of power reception coil 11.

Temperature detection devices 58D, 58E, and 58F are arranged on a side of left direction L relative to power reception coil 11, and are arranged at a distance from one another along the outer periphery of power reception coil 11.

Temperature detection devices 58G, 58H, and 58I are arranged on a side of backward direction B side relative to power reception coil 11, and are arranged at a distance from one another along the outer periphery of power reception coil 11.

Temperature detection devices 58J, 58K, and 58L are arranged on a side of right direction R relative to power reception coil 11, and are arranged at a distance from one another along the outer periphery of power reception coil 11.

Figure 6:
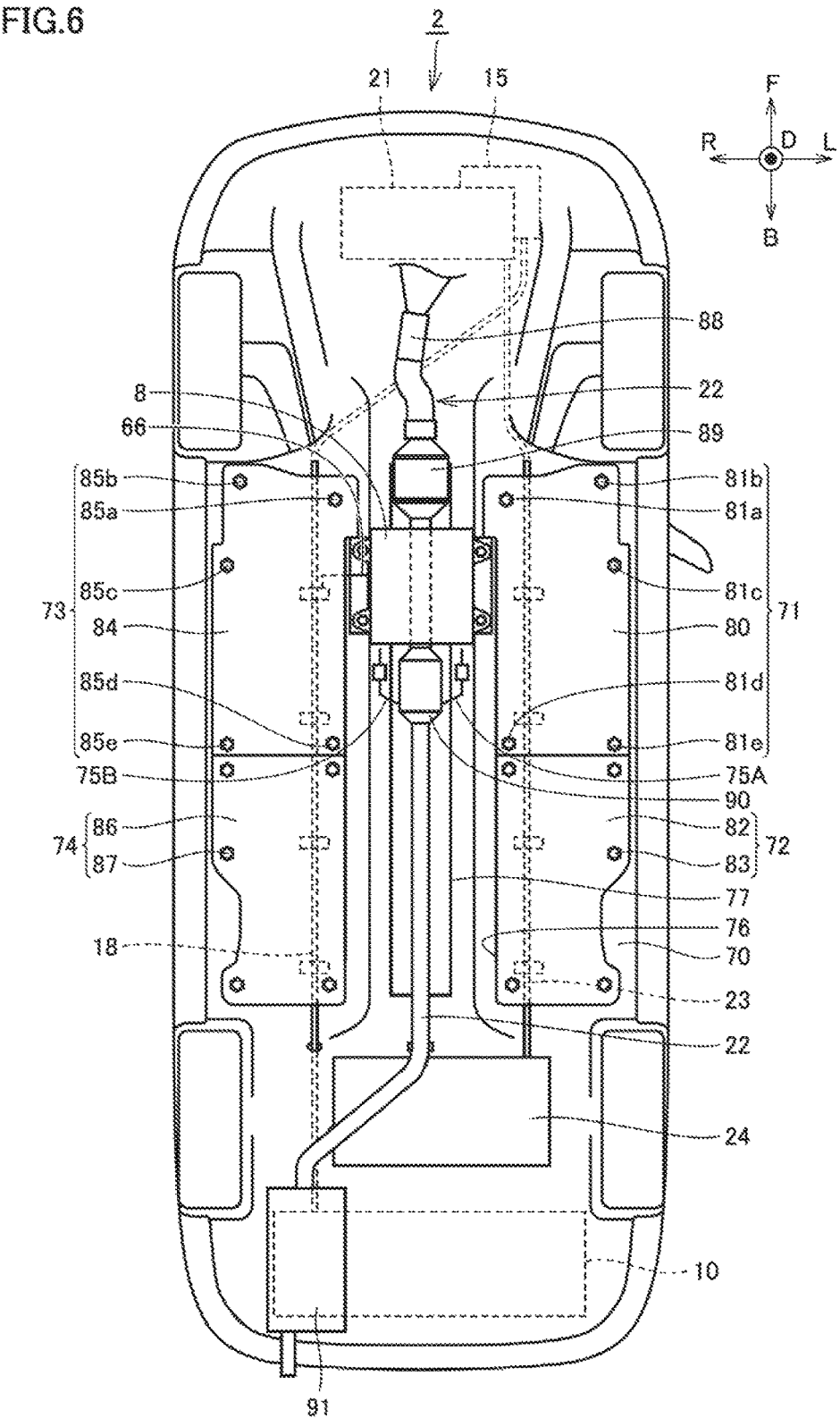
FIG. 6 is a bottom view showing a bottom surface of a vehicle 2.
Figure 7:
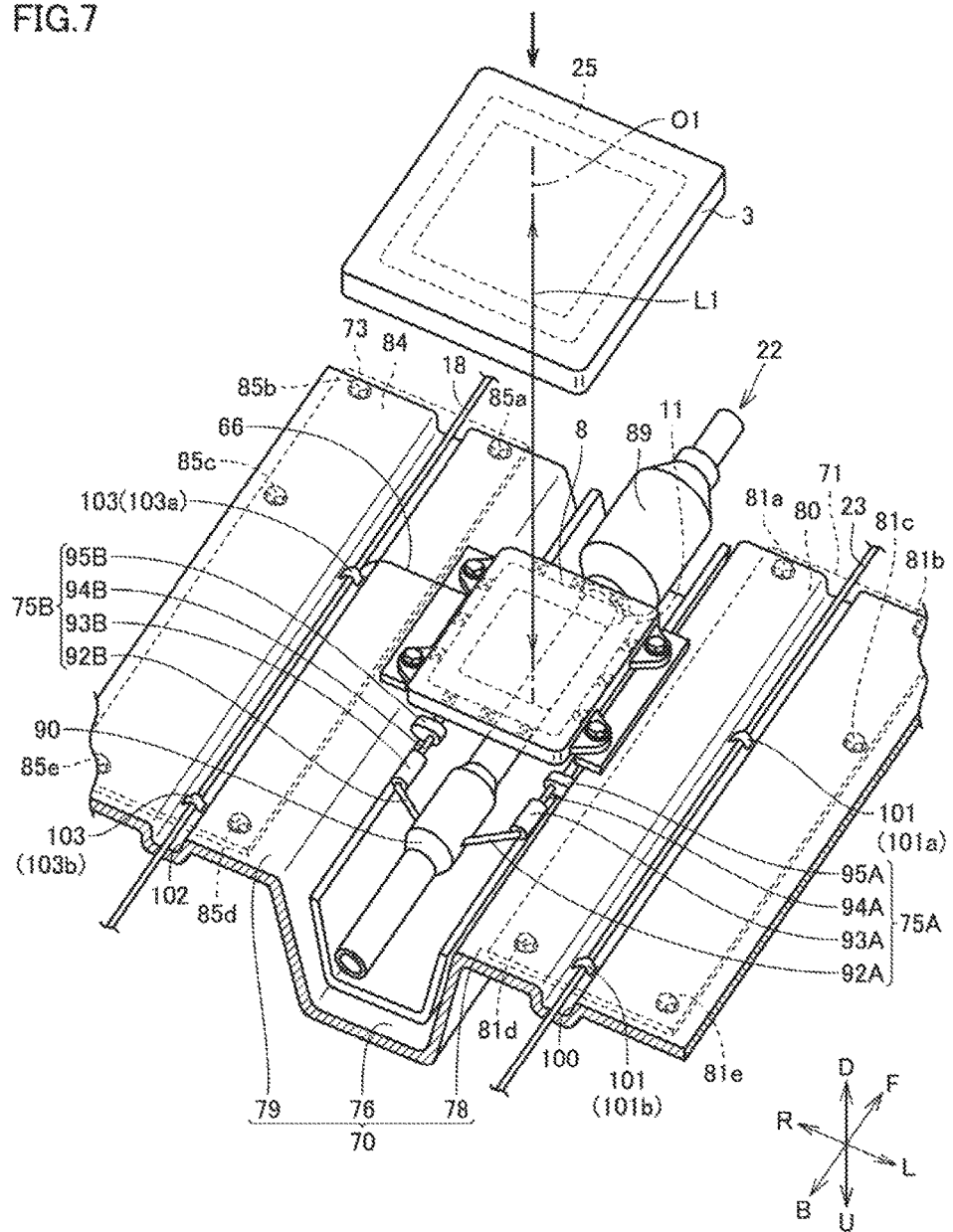
FIG. 7 is a perspective view showing a floor panel 70 and members provided on floor panel 70.

FIG. 6 is a bottom view showing the bottom surface of vehicle 2, and FIG. 7 is a perspective view showing floor panel 70 and members provided on floor panel 70. As shown in FIG. 6, vehicle 2 includes floor panel 70 arranged on the bottom surface of vehicle 2, power reception device 8 provided on the lower surface of floor panel 70, a plurality of undercovers 71, 72, 73, and 74 provided on the lower surface of floor panel 70, exhaust pipe unit 22 provided on the lower surface of floor panel 70, and support members 75A, 75B that support exhaust pipe unit 22. Also arranged on the lower surface of floor panel 70 are wire harness 18 connecting battery 10 and converter 15, and fuel pipe 23 connecting engine 21 and fuel tank 24.

As shown in FIG. 7, floor panel 70 includes a central tunnel 76 extending in the forward and backward directions of vehicle 2, and flat portions 78, 79 connected to central tunnel 76. Flat portion 78 is arranged on the side of left direction L relative to central tunnel 76, and flat portion 79 is arranged on the side of right direction R relative to central tunnel 76. Note that a plurality of depressions and projections (not shown) are formed on the surface of each of flat portions 78 and 79.

Power reception device 8 is arranged to extend across central tunnel 76. Undercover 71 is arranged in a position adjacent to power reception device 8 in left direction L, and is arranged on flat portion 78. Undercover 73 is arranged in a position adjacent to power reception device 8 in right direction R, and is arranged on flat portion 79. Note that undercover 72 shown in FIG. 6 is arranged on the side of backward direction B relative to undercover 71, and undercover 74 is arranged on the side of backward direction B relative to undercover 73.

Undercover 71 includes a cover body 80 formed of a resin material, and a plurality of fixing members 81a to 81e that fixes cover body 80 onto floor panel 70, and undercover 73 includes a cover body 84 and a plurality of fixing members 85a to 85e that fixes cover body 84 onto floor panel 70. Similarly, as shown in FIG. 6, undercover 72 includes a cover body 82 formed of a resin material, and a plurality of fixing members 83 that fixes cover body 82 onto floor panel 70, and undercover 74 includes a cover body 86 and a plurality of fixing members 87 that fixes cover body 86 onto floor panel 70.

Figure 8:
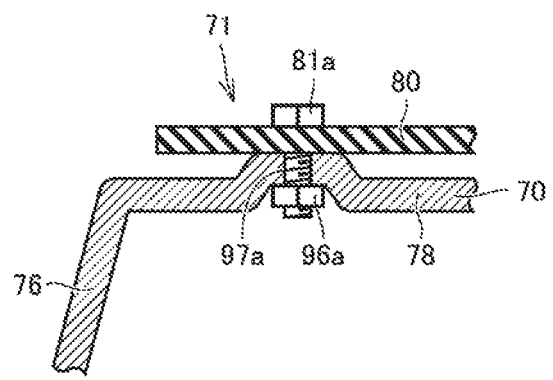
FIG. 8 is a cross-sectional view showing a peripheral structure of a fixing member 81a for an undercover 71.

FIG. 8 is a cross-sectional view showing a peripheral structure of fixing member 81a for undercover 71. As shown in FIG. 8, a mounting seat 97a protruding above is formed on flat portion 78 of floor panel 70. A through hole is formed in mounting seat 97a. A shank of fixing member 81a, i.e., a bolt, is inserted into this through hole, and a nut 96a is mounted on a lower end of the shank of fixing member 81a. Other fixing members 81b to 81e are fixed onto floor panel 70 in the same manner. Undercover 71 is fixed to floor panel 70 with fixing members 81a to 81e.

Portions of undercover 71 on which fixing members 81a to 81e are mounted are contact portions in contact with floor panel 70, while other portions of undercover 71 excluding the contact portions are apart from floor panel 70. Of the plurality of fixing members 81a to 81e, fixing member 81a is located in a position closest to power reception coil 11, and is provided on the side of forward direction F relative to power reception coil 11. Therefore, of the plurality of contact portions of undercover 71, the contact portion in contact with floor panel 70 through fixing member 81a is the closest to power reception coil 11, and this contact portion is located on the side of forward direction F relative to power reception coil 11.

Figure 9:
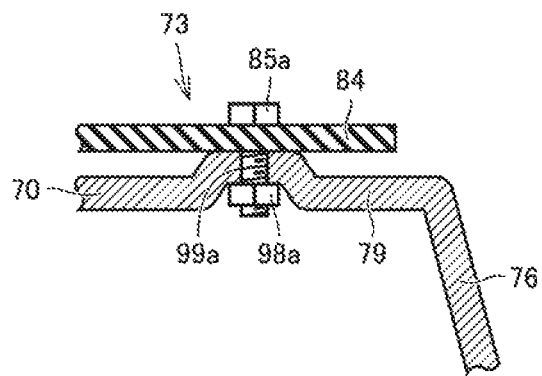
FIG. 9 is a cross-sectional view showing a peripheral structure of a fixing member 85a for an undercover 73.

FIG. 9 is a cross-sectional view showing a peripheral structure of fixing member 85a for undercover 73. As shown in FIG. 9, a mounting seat 99a protruding above is formed on flat portion 79 of floor panel 70. A through hole is formed in mounting seat 99a. A shank of fixing member 85a, i.e., a bolt, is inserted into this through hole, and a nut 98a is mounted on a lower end of the shank of fixing member 85a. Other fixing members 85b to 85e are fixed onto floor panel 70 in the same manner. Undercover 73 is fixed to floor panel 70 with fixing members 85a to 85e.

Portions of undercover 73 on which fixing members 85a to 85e are mounted are contact portions in contact with floor panel 70, while other portions of undercover 73 excluding the contact portions are apart from floor panel 70. Of the plurality of fixing members 85a to 85e, fixing member 85a is located in a position closest to power reception coil 11, and is provided on the side of forward direction F relative to power reception coil 11. Therefore, of the plurality of contact portions of undercover 73, the contact portion in contact with floor panel 70 through fixing member 85a is the closest to power reception coil 11, and this contact portion is located on the side of forward direction F relative to power reception coil 11.

In FIG. 6, exhaust pipe unit 22 includes a catalyst device 88 connected to an exhaust manifold provided in engine 21, a catalyst device 89 connected to catalyst device 88 through the exhaust pipe, a sub muffler 90 connected to catalyst device 89 through the exhaust pipe, and a main muffler 91 connected to sub muffler 90 through the exhaust pipe. As shown in FIG. 7, catalyst device 89 and sub muffler 90 are arranged within central tunnel 76.

Support members 75A, 75B connect sub-muffler 90 of exhaust pipe unit 22 and floor panel 70. Support member 75A includes a support portion 92A having one end connected to sub muffler 90, a cushion member 93A connected to the other end of support portion 92A, and a support portion 94A connected to cushion member 93A and connected to a mounting portion 95A protruding from an inner surface of central tunnel 76. Support member 75B includes a support portion 92B having one end connected to sub muffler 90, cushion member 93B connected to the other end of support portion 92B, and a support portion 94B connected to a cushion member 93B and connected to a mounting portion 95B protruding from the inner surface of central tunnel 76. Note that support members 75A, 75B are located on the side of backward direction B relative to power reception device 8, and a connected portion of cushion member 93A with support member 94A is located on the side of backward direction B relative to power reception coil 11. Similarly, a connected portion of cushion member 93B with support member 94B is located on the side of backward direction B relative to power reception coil 11. Cushion members 93A, 93B are formed of a resin material, for example.

Fuel pipe 23 is arranged within a groove 100 formed in flat portion 78, and groove 100 is formed to extend in the forward and backward directions of the vehicle. Fuel pipe 23 is provided with a plurality of fixing members 101 at a distance from each other, which fix fuel pipe 23 within groove 100. Note that fixing member 101a is arranged on the side of left direction L relative to power reception device 8, and fixing member 101b is arranged on the side of backward direction B relative to fixing member 101a. Thus, of the plurality of fixing members 101, fixing member 101a is located in a position closest to power reception device 8. Fixing members 101 are formed of a resin material. Each of fixing members 101 is fixed to the lower surface of floor panel 70 with a bolt or the like, and has a portion in contact with the lower surface of floor panel 70. The contact portion of fixing member 101a is located on the side of left direction L relative to power reception coil 11. Undercover 71 is arranged over fuel pipe 23 and fixing members 101 arranged within groove 100.

Wire harness 18 is arranged within a groove 102 formed in flat portion 79, and groove 102 is formed to extend in the forward and backward directions of the vehicle. Wire harness 18 is provided with a plurality of fixing members 103 at a distance from each other, which fix wire harness 18 within groove 102. Each of fixing members 103 is formed of a resin material. Each of fixing members 103 is fixed to the lower surface of floor panel 70 with a bolt or the like, and has a contact portion in contact with floor panel 70. Note that of the plurality of fixing members 103, fixing member 103a is located in a position closest to power reception device 8. Fixing member 103a is arranged on the side of right direction R relative to power reception device 8, and the contact portion between fixing member 103a and floor panel 70 is located on the side of right direction R relative to power reception coil 11. Undercover 73 is arranged over wire harness 18 and fixing members 103 arranged within groove 102.

In FIGS. 1 and 5, control unit 6 monitors a detection temperature of each of temperature detection devices 58A to 58L during power transfer. When any of detection temperatures from temperature sensors 53A, 53B, and 53C of temperature detection devices 58A, 58B, and 58C has become equal to or higher than a threshold temperature TH1, control unit 6 sends, via communication unit 7 and communication unit 29, a power reduction signal to power transmission device 3 instructing it to reduce the power to be transmitted. Similarly, when any of detection temperatures from temperature sensors 53G, 53H, and 53I of temperature detection devices 58G, 58H, and 58I has become equal to or higher than a threshold temperature TH2, control unit 6 sends, via communication unit 7 and communication unit 29, a power reduction signal to power transmission device 3 instructing it to reduce the power to be transmitted. Similarly, when any of detection temperatures from temperature sensors 53J, 53K, and 53L of temperature detection devices 58J, 58K, and 58L has become equal to or higher than a threshold temperature TH3, control unit 6 sends, via communication unit 7 and communication unit 29, a power reduction signal to power transmission device 3 instructing it to reduce the power to be transmitted. Similarly, when any of detection temperatures from temperature sensors 53D, 53E, and 53F of temperature detection devices 58D, 58E, and 58F has become equal to or higher than a threshold temperature TH4, control unit 6 sends a power reduction signal to power transmission device 3 instructing it to reduce the power to be transmitted.

Upon reception of any of the above-described signals, control unit 28 of power transmission device 3, controls frequency converter 27 to reduce the power to be transmitted.

Each of threshold temperatures TH1 to TH4 is set such that the temperature of each of the various members, provided on floor panel 70, such as undercover 71 and the like, does not exceed the heat-resistant temperature, during a period from the start of power transfer from power transmission coil 25 to power reception coil 11, to the completion of charging, with power reception coil 11 and power transmission coil 25 being displaced from each other.

Now, each of threshold temperatures TH1 to TH4 will be described by describing how the power reception position of power reception device 8 with reference to power transmission device 3 is correlated with the magnetic field strength distribution, the temperature of each of metal pieces 52A to 52L, the temperature of each of undercovers 71 and 73, the temperature of each of cushion members 93A and 93B, and the temperature of each of fixing members 101a and 103a.

Figure 10:
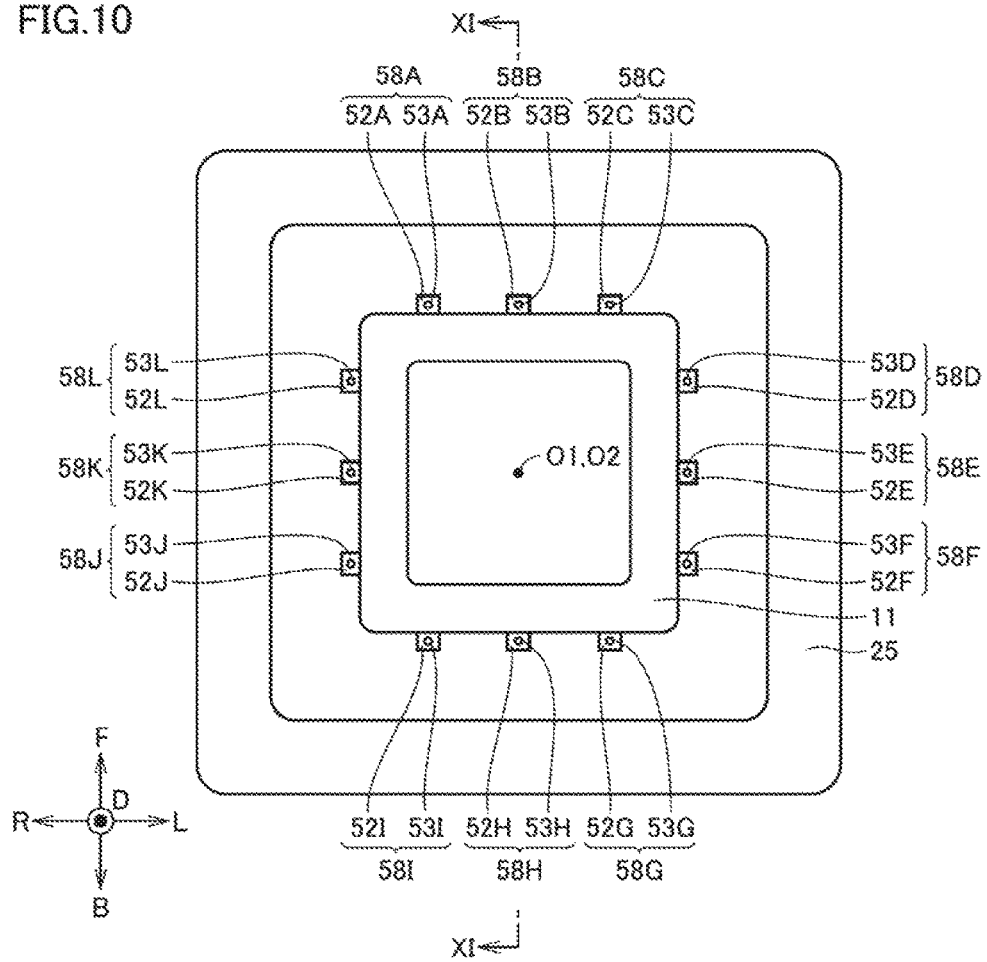
FIG. 10 is a plan view of a power transmission coil 25, a power reception coil 11, and the like when viewed in the direction of the arrow shown in FIG. 7.
Figure 11:
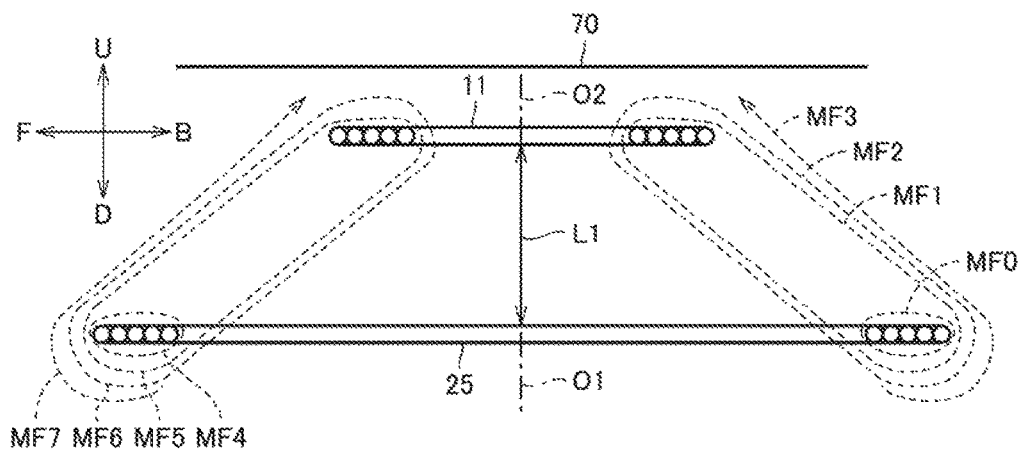
FIG. 11 is a cross-sectional view along line XI-XI shown in FIG. 10.

FIG. 10 is a plan view of power transmission coil 25, power reception coil 11, and the like when viewed in the direction of the arrow shown in FIG. 7, and FIG. 11 is a cross-sectional view along line XI-XI shown in FIG. 10.

As shown in FIGS. 10 and 11, AC power is supplied to power transmission coil 25, with winding axis O1 of power transmission coil 25 and winding axis O2 of power reception coil 11 being aligned, and power transmission coil 25 and power reception coil 11 being apart at prescribed distance L1.

Figure 12:
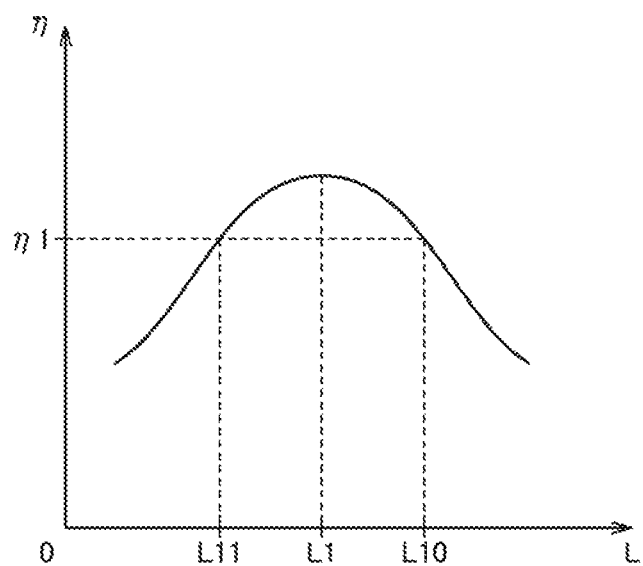
FIG. 12 is a graph showing a relation between the distance (L) between power transmission coil 25 and power reception coil 11, and power reception efficiency (TO at which power reception coil 11 receives power.

FIG. 12 is a graph showing a relation between the distance (L) between power transmission coil 25 and power reception coil 11, and power reception efficiency ($\eta$) at which power reception coil 11 receives power. Specifically, FIG. 12 shows how the power reception efficiency changes as the distance between power reception coil 11 and power transmission coil 25 is varied, with power transmission coil 25 and power reception coil 11 being vertically opposed to each other. As shown in FIG. 12, the power reception efficiency is the highest when the distance between power transmission coil 25 and power reception coil 11 is prescribed distance L1.

In FIG. 11, when AC power is supplied to power transmission coil 25, magnetic fluxes MF1 to MF7 are formed around power transmission coil 25. On a forward side of power reception coil 11, magnetic fluxes MF5, MF6 pass through power reception coil 11 and power transmission coil 25. On a backward side of power reception coil 11, magnetic fluxes MF1, MF2 pass through power reception coil 11 and power transmission coil 25. On the other hand, magnetic fluxes MF3, MF7 travel toward floor panel 70 without passing through power reception coil 11, while magnetic fluxes MF0, MF4 form a closed loop around power transmission coil 25.

Because the distance between power reception coil 11 and power transmission coil 25 is substantially equal across a substantially entire perimeter of power reception coil 11, part of the magnetic flux emitted from power transmission coil 25 also passes through power reception coil 11 and power transmission coil 25 on the side of left direction L and the right direction R side of power reception coil 11. Similarly, part of the magnetic flux emitted from power transmission coil 25 travels toward floor panel 70, while part of the magnetic flux emitted from power transmission coil 25 forms a closed loop around power transmission coil 25.

Figure 13:
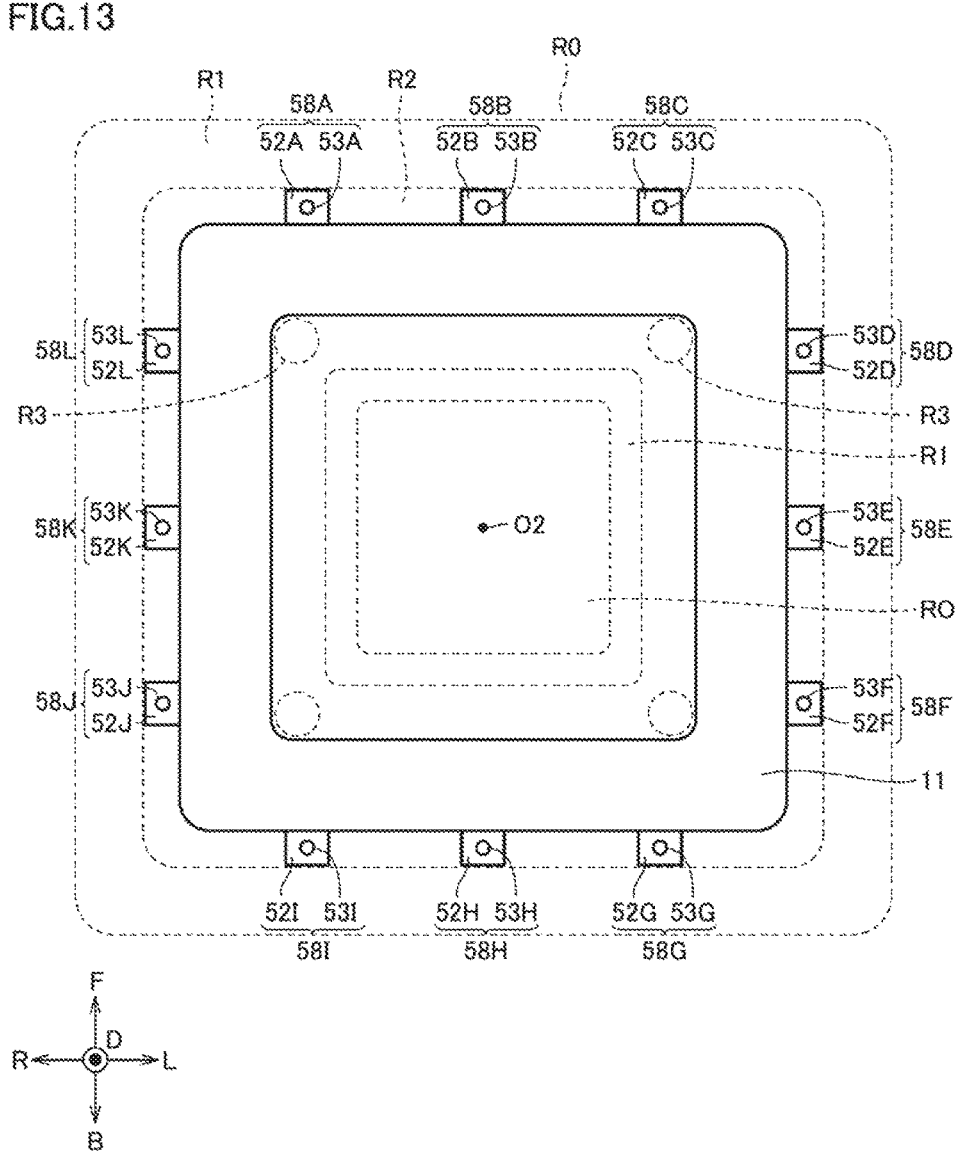
FIG. 13 is a bottom view of power reception coil 11 and power transmission coil 25 when viewed from below the power transmission coil.

FIG. 13 is a schematic diagram showing magnetic field strength when power reception coil 11 and power transmission coil 25 are arranged as shown in FIG. 10. Note that FIG. 13 is a bottom view of power reception coil 11 and power transmission coil 25 when viewed from below.

In FIG. 13, the magnetic field strength increases from a region R0 toward a region R3. As shown in FIG. 13, all of metal pieces 52A to 52L are located within a region R2.

Figure 14:
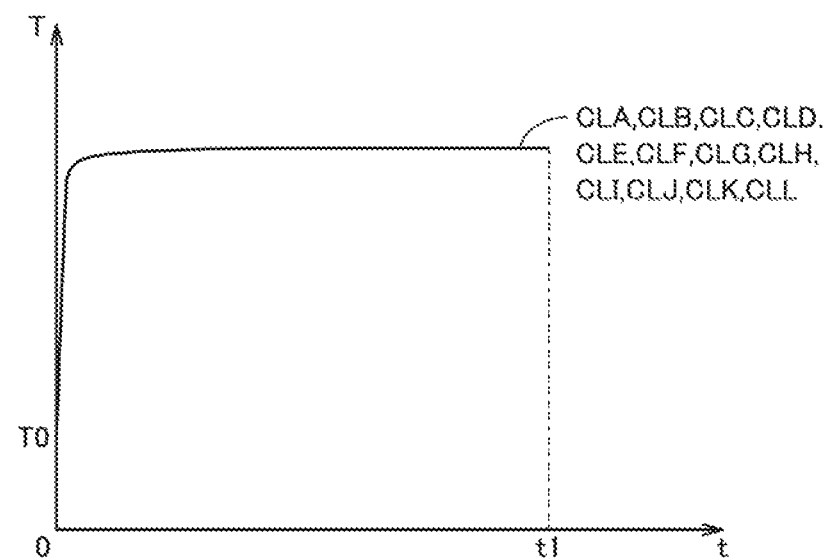
FIG. 14 is a graph conceptually showing a predictive value of a detection temperature from each of temperature sensors 53A to 53L during a period from the start of power transmission from power transmission coil 25 to the completion of battery charging, when power reception coil 11 and power transmission coil 25 are arranged as shown in FIG. 11.

FIG. 14 is a graph conceptually showing a predictive value of a detection temperature from each of temperature sensors 53A to 53L during the period from the start of power transmission from power transmission coil 25 to the completion of battery charging, when power reception coil 11 and power transmission coil 25 are arranged as shown in FIG. 11. Temperature curves CLA, CLB, CLC, CLD, CLE, CLF, CLG, CLH, CLI, CLJ, CLK, and CLL show predictive detection temperatures of temperature sensors 53A, 53B, 53C, 53D, 53E, 53F, 53G, 53H, 53I, 53J, 53K, and 53L, respectively.

Power transmission from power transmission coil 25 starts at t=0, and ends at time t1. Note that after t=t1, the predictive detection temperature from each of temperature sensors 53A to 53L is not shown.

As shown in FIG. 14, temperature curves CLA, CLB, CLC, CLD, CLE, CLF, CLG, CLH, CLI, CLJ, CLK, and CLL substantially coincide with one another. It is thus seen that the temperature of each of metal pieces 52A to 52L increases in a similar manner with time.

This is because all of metal pieces 52A to 52L are located within region R2 as shown in FIG. 13, such that the amount of magnetic flux passing through each of metal pieces 52A to 52L is substantially equal, and moreover, each of metal pieces 52A to 52L is formed of the same metal material.

Note that the temperature of each of metal pieces 52A to 52L is increased by an amount of heat generated by an eddy current. On the other hand, when the temperature of each of metal pieces 52A to 52L increases, the amount of heat radiated from each of metal pieces 52A to 52L to the ambient air and the like also increases. The temperature of each of metal pieces 52A to 52L becomes constant at a temperature at which there is a balance between the amount of heat radiated from each of metal pieces 52A to 52L to the ambient air and the like, and the amount of heat generated by the eddy current. Note that metal pieces 52A to 52L are foiled of a metal material with a heat conductivity higher than that of floor panel 70. For example, metal pieces 52A to 52L are formed of aluminum, and floor panel 70 is formed of iron.

As shown in FIG. 11, magnetic fluxes MF3, MF7 of magnetic fluxes MF0 to MF7 emitted from power transmission coil 25 are leakage fluxes that travel toward floor panel 70 without passing through power reception coil 11. The leakage fluxes also travel toward floor panel 70 on the side of left direction L and the side of right direction R of power reception coil 11 in an amount equal to that on the side of forward direction F and the side of backward direction B.

In FIG. 7, undercovers 71, 73 formed of a resin material allow the magnetic flux from power transmission coil 25 to pass through them. Thus, the leakage fluxes reach floor panel 70. When the leakage fluxes enter floor panel 70, an eddy current flows through the surface of floor panel 70, which causes floor panel 70 to generate heat. As shown in FIG. 13, because the magnetic field strength decreases with increasing distance from power reception coil 11, the amount of incoming leakage fluxes into floor panel 70 also decreases with increasing distance from power reception coil 11. The temperature of floor panel 70 therefore decreases with increasing distance from power reception coil 11.

The heat of floor panel 70 is transferred to undercover 71 through mounting seat 97a shown in FIG. 8. This results in an increase in the temperature of the contact portion of undercover 71 fixed in contact with floor panel 70 using fixing member 81a.

Note that in FIG. 7, the heat of floor panel 70 is also transferred to undercover 71 in the contact portions fixed in contact with floor panel 70 using fixing members 81b to 81e. Because fixing member 81a of fixing members 81a to 81e of undercover 71 is the closest to power reception coil 11, the contact portion of undercover 71 fixed with fixing member 81a is heated to the highest temperature.

The heat of floor panel 70 is transferred to undercover 73 through the mounting seat for each of fixing members 85a to 85e. Because fixing member 85a of fixing members 85a to 85e of undercover 73 is the closest to power reception coil 11, the contact portion of undercover 73 fixed with fixing member 85a is heated to the highest temperature.

The heat of floor panel 70 reaches cushion member 93A through mounting portion 95A and support portion 94A. Moreover, the magnetic flux enters sub muffler 90, which causes heat due to the eddy current to be generated in sub muffler 90. The heat of sub muffler 90 reaches cushion member 93A through support portion 92A. Cushion member 93A, therefore, has an increased temperature in the connected portion with each of support portions 92A and 94A. In particular, in this embodiment, the temperature of the connected portion of cushion member 93A with support portion 94A is increased. Note that the connected portion of cushion member 93A with support member 94A is located on the side of backward direction B relative to power reception coil 11.

The heat of floor panel 70 reaches cushion member 93B through mounting portion 95B and support portion 94B. The heat of sub muffler 90 reaches cushion member 93B through support portion 92B. Cushion member 93B, therefore, has an increased temperature in the connected portion with each of support portions 92B and 94B. In particular, in this embodiment, the temperature of the connected portion of cushion member 93B with support portion 94B is increased. Note that the connected portion of cushion member 93B with support member 94B is arranged on the side of backward direction B relative to power reception coil 11.

The heat of floor panel 70 is also transferred to each of fixing members 101 through the contact portion in contact with floor panel 70. Because fixing member 101a of the plurality of fixing members 101 is the closest to power reception device 8, the contact portion between fixing member 101a and floor panel 70 is heated to the highest temperature. Similarly, the contact portion between floor panel 70 and fixing member 103a of the plurality of fixing members 103 is heated to the highest temperature.

Figure 15:
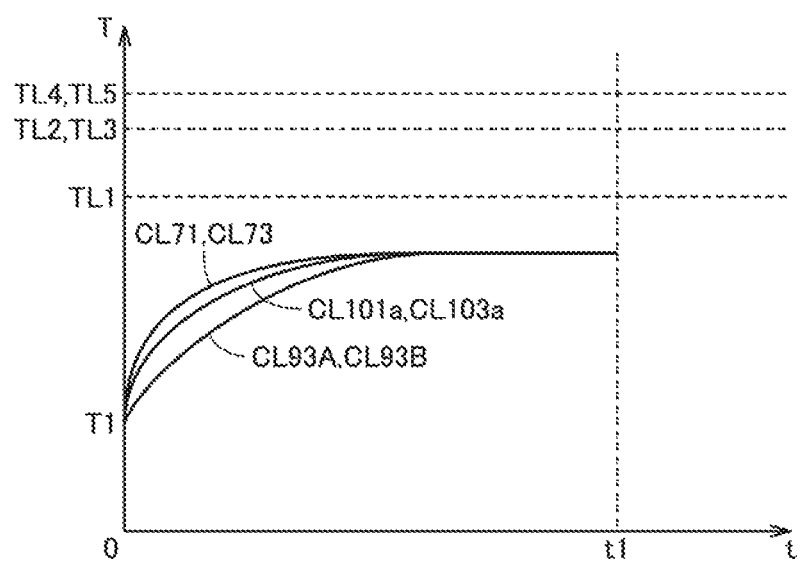
FIG. 15 is a graph conceptually showing a predictive temperature of each of the members during the period from the start of power transmission from power transmission coil 25 to the completion of battery charging, when power reception coil 11 and power transmission coil 25 are arranged as shown in FIG. 11.

FIG. 15 is a graph conceptually showing a predictive temperature of each of the members during the period from the start of power transmission from power transmission coil 25 to the completion of battery charging, when power reception coil 11 and power transmission coil 25 are arranged as shown in FIG. 11. In FIG. 15, a temperature curve CL71 shows a predictive temperature of the contact portion of undercover 71 fixed with fixing member 81a. A temperature curve CL73 shows a predictive temperature of the contact portion of undercover 73 fixed with fixing member 85a.

A temperature curve CL103a shows a predictive temperature of the contact portion of fixing member 103a in contact with floor panel 70, and a temperature curve CL101a shows a predictive temperature of the contact portion of fixing member 101a in contact with floor panel 70.

A temperature curve CL93A shows a predictive temperature of the connected portion of cushion member 93A with support portion 94A, and a temperature curve CL93B shows a predictive temperature of the connected portion of cushion member 93B with support portion 94B.

A heat-resistant temperature TL1 shows a heat-resistant temperature of undercovers 71, 73, and heat-resistant temperatures TL2 and TL3 show heat-resistant temperatures of fixing members 101a and 103a. A heat-resistant temperature TL4 shows a heat-resistant temperature of cushion member 93A, and a heat-resistant temperature TL5 shows a heat-resistant temperature of cushion member 93B. Each of the heat-resistant temperatures is a temperature of deflection under load, which can be measured according to the JIS standard "JIS K7191-1". Note that undercovers 71 and 72, which are formed of the same resin material, have the same heat-resistant temperature.

When power is transmitted from power transmission coil 25, part of the magnetic flux emitted from power transmission coil 25 enters floor panel 70, which causes the temperature of floor panel 70 to increase.

This causes an increase in the predictive temperature of the contact portion of undercover 71 fixed with fixing member 81a, the predictive temperature of the contact portion of undercover 73 fixed with fixing member 85a, the predictive temperature of the contact portion of fixing member 103a in contact with floor panel 70, the predictive temperature of the contact portion of fixing member 101a in contact with floor panel 70, the predictive temperature of the connected portion of cushion member 93A with support portion 94A, and the predictive temperature of the connected portion of cushion member 93B with support portion 94B.

As shown in FIG. 15, it is seen that during the period from the start of power transmission to time t1, the temperatures of the contact portions of undercovers 71, 73 do not exceed heat-resistant temperature TL1. Similarly, the predictive temperatures of fixing members 101a, 103a do not exceed heat-resistant temperatures TL2, TL3. Similarly, the predictive temperatures of the respective connected portions of cushion members 93A, 93B do not exceed heat-resistant temperatures TL4, TL5.

It is thus seen that the temperature of each of these members does not exceed the heat-resistant temperature when power reception coil 11 receives power with power reception coil 11 and power transmission coil 25 being apart from each other at prescribed distance L1, and winding axis O2 of power reception coil 11 and winding axis O1 of power transmission coil 25 being aligned horizontally.

Figure 16:
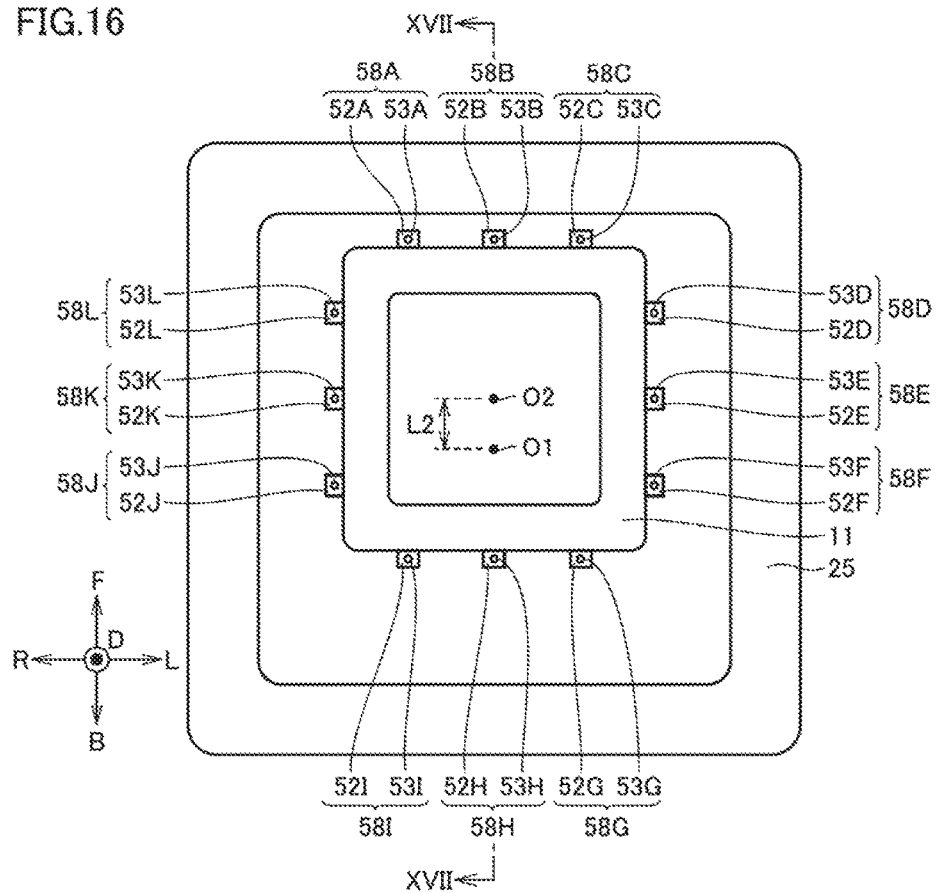
FIG. 16 is a bottom view showing a state in which power reception coil 11 has been moved a distance L2 horizontally in a forward direction F with reference to power transmission coil 25, with power reception coil 11 and power transmission coil 25 being vertically apart from each other at a prescribed distance L1.

FIG. 16 is a bottom view showing a state in which power reception coil 11 is displaced a distance L2 in forward direction F with reference to power transmission coil 25, with power reception coil 11 and power transmission coil 25 being vertically apart from each other at prescribed distance L1.

Figure 17:
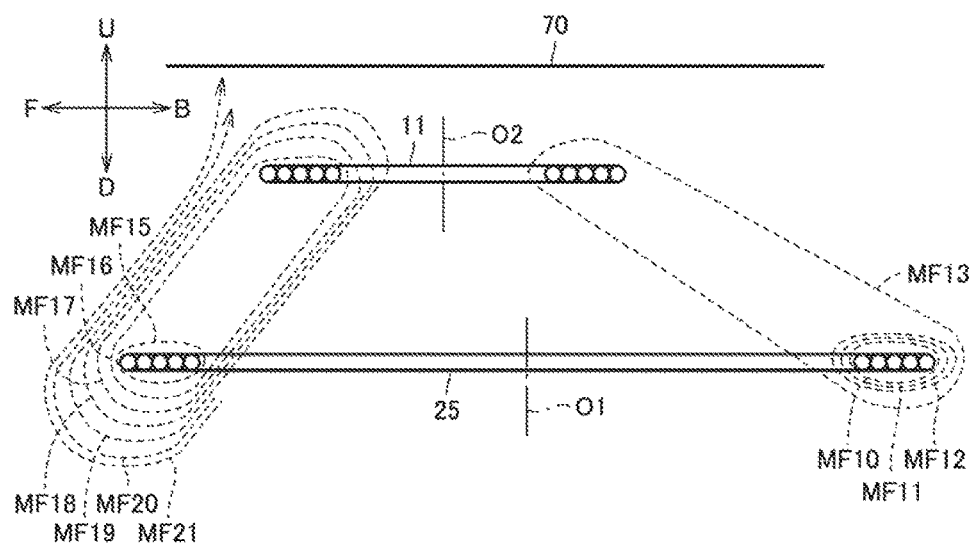
FIG. 17 is a cross-sectional view along line XVII-XVII shown in FIG. 16.

As shown in FIG. 16, winding axis O2 (central position C2) of power reception coil 11 is displaced in forward direction F, with reference to winding axis O1 (central position C1) of power transmission coil 25. In this case, the displacement direction is forward direction F. A portion on the side of forward direction F of power reception coil 11 is closer to a portion on the side of forward direction F of power transmission coil 25, as shown in FIG. 17. On the other hand, a portion on the side of backward direction B of power reception coil 11 is more distant from a portion on the side of backward direction B of power transmission coil 25.

Because the distance between the portion on the side of forward direction F of power reception coil 11 and the portion on the side of forward direction F of power transmission coil 25 is shorter, more magnetic fluxes MF16 to MF19 pass through power reception coil 11 and power transmission coil 25, between the portion on the side of forward direction F of power reception coil 11 and the portion on the side of forward direction F of power transmission coil 25. On the other hand, only a small amount of a magnetic flux MF13 passes through power reception coil 11 and power transmission coil 25, between the portion on the side of backward direction B of power reception coil 11 and the portion on the side of backward direction B of power transmission coil 25.

Figure 18:
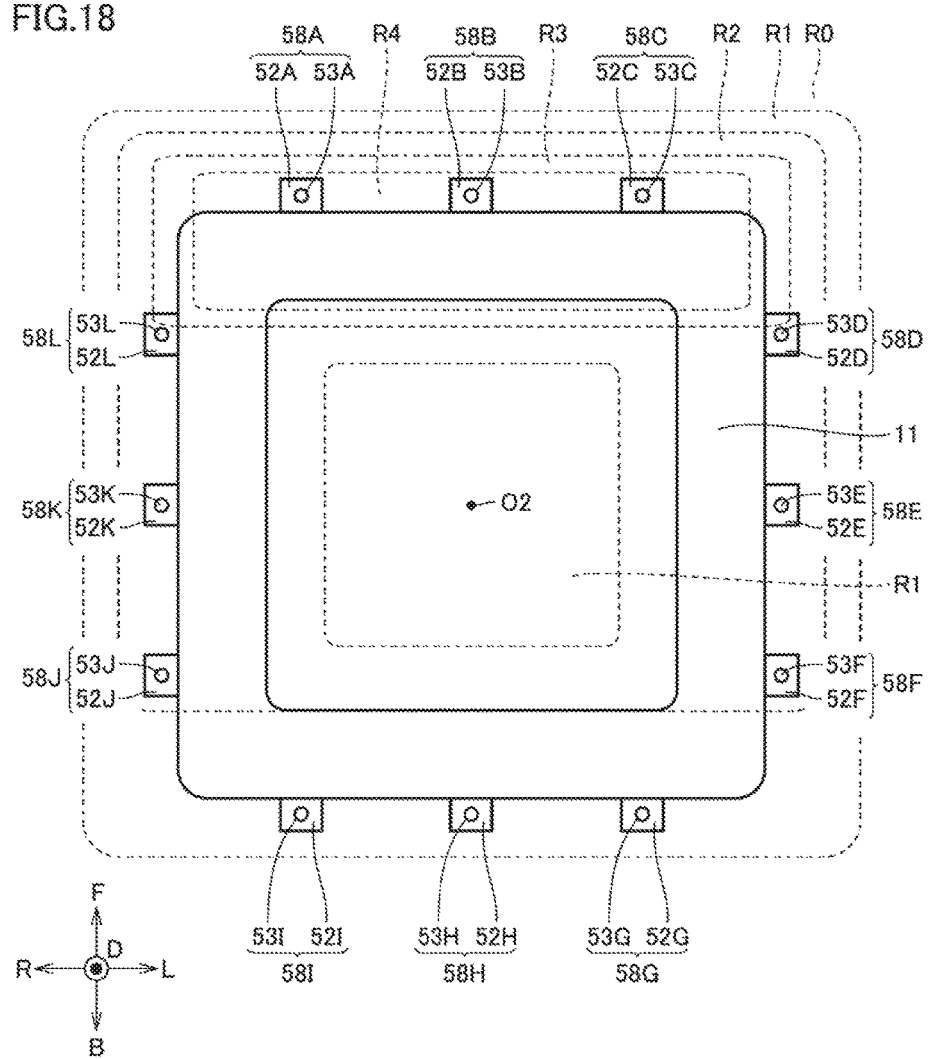
FIG. 18 is a bottom view of power reception coil 11 and power transmission coil 25 when viewed from below the power transmission coil.

As shown in FIG. 18, therefore, the magnetic field strength is higher on the side of forward direction F of power reception coil 11, while the magnetic field strength is lower on the side of backward direction B of power reception coil 11. Note that the magnetic field strength increases from a region R0 toward a region R4.

The temperature of metal pieces 52A, 52B, and 52C becomes higher because they are located within region R4 having higher magnetic field strength. On the other hand, metal pieces 52G, 52H, and 52I are located within a region R1 having magnetic field strength lower than that of region R4. Metal pieces 52D, 52E, 52F, 52J, 52K, and 52L are located within a region R2.

Figure 19:
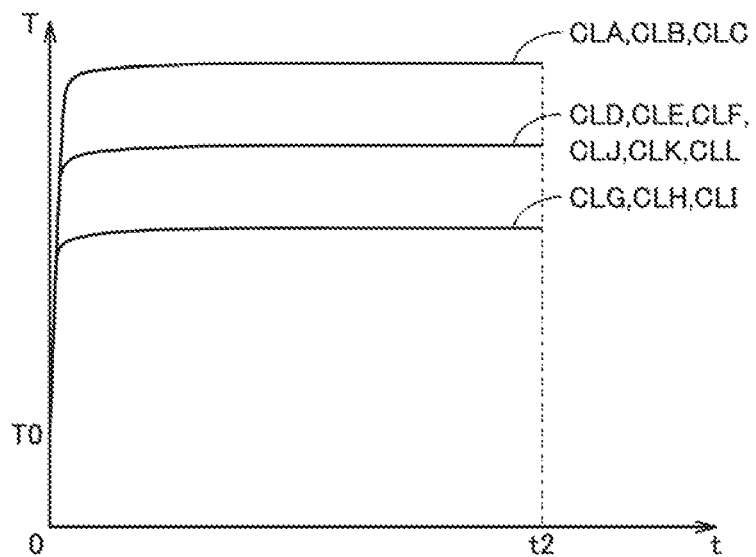
FIG. 19 is a graph conceptually showing a predictive value of a detection temperature from each of temperature sensors 53A to 53L during the period from the start of power transmission from power transmission coil 25 to the completion of battery charging, when power reception coil 11 and power transmission coil 25 are arranged as shown in FIG. 17.

As shown in FIG. 19, therefore, temperature curves CLA, CLB, and CLC of predictive detection temperatures from temperature sensors 53A, 53B, and 53C are higher than temperature curves CLG, CLH, and CLI of predictive detection temperatures from temperature sensors 53G, 53H, and 53I.

Now, from a comparison between the magnetic field strength distribution shown in FIG. 13 and the magnetic field strength distribution shown in FIG. 18, it is seen that metal pieces 52A, 52B, and 52C shown in FIG. 13 are located within region R2, while metal pieces 52A, 52B, and 52C shown in FIG. 18 are located within region R4 having a magnetic field strength higher than that of region R2. In FIGS. 14 and 19, therefore, the temperatures of temperature curves CLA, CLB, and CLC shown in FIG. 19 are higher than the temperatures of temperature curves CLA, CLB, and CLC shown in FIG. 14. Hence, the temperatures of metal pieces 52A, 52B, and 52C located on the side of forward direction F relative to power reception coil 11 become higher when power reception coil 11 is displaced in forward direction F relative to power transmission coil 25.

Note that metal pieces 52G, 52H, and 52I shown in FIG. 13 are located within region R2, while metal pieces 52G, 52H, and 52I shown in FIG. 18 are located within region R1. The temperatures of temperature curves CLG, CLH, and CLI shown in FIG. 19 are therefore lower than the temperatures of temperature curves CLG, CLH, and CLI shown in FIG. 14.

Metal pieces 52D, 52E, 52F, 52J, 52K, and 52L shown in FIG. 13 are located within region R2, and metal pieces 52D, 52E, 52F, 52J, 52K, and 52L shown in FIG. 18 are also located within region R2. Therefore, the temperatures of temperature curves CLD, CLE, CLF, CLJ, CLK, and CLL shown in FIG. 19 are substantially equal to the temperatures of temperature curves CLD, CLE, CLF, CLJ, CLK, and CLL shown in FIG. 14.

Because the magnetic field strength is higher on the side of forward direction F of power reception coil 11 as shown in FIG. 18, more magnetic fluxes MF20, MF21 are emitted from power transmission coil 25 toward floor panel 70 on the side of forward direction F relative to power reception coil 11, as shown in FIG. 17.

The amount of leakage flux toward floor panel 70 increases as the magnetic field strength increases. Hence, the amount of incoming magnetic flux into a portion of floor panel 70 located on the side of forward direction F relative to power reception coil 11 is greater than the amount of incoming magnetic flux into a portion of floor panel 70 located on the side of backward direction B relative to power reception coil 11. Similarly, the amount of incoming magnetic flux into the portion of floor panel 70 located on the side of forward direction F relative to power reception coil 11 is greater than the amount of incoming magnetic flux into a portion of floor panel 70 located on the side of right direction R relative to power reception coil 11. Similarly, the amount of incoming magnetic flux into the portion of floor panel 70 located on the side of forward direction F relative to power reception coil 11 is greater than the amount of incoming magnetic flux into a portion of floor panel 70 located on the side of left direction L relative to power reception coil 11. Note that the amount of incoming magnetic flux into the portion of floor panel 70 located on the side of backward direction B relative to power reception coil 11 is smaller than the amount of incoming magnetic flux into the portion of floor panel 70 located on the side of right direction R or left direction L side relative to power reception coil 11. Therefore, the temperature of the portion of floor panel 70 located on the side of backward direction B relative to power reception coil 11 is lower than the temperature of the portion of floor panel 70 located on the side of left direction L or right direction R side relative to power reception coil 11.

Hence, the temperature of the portion of floor panel 7 located on the side of forward direction F relative to power reception coil 11 is higher than the temperature of any of the portions of floor panel 7 located on the side of backward direction B, the side of right direction R, and the side of left direction L relative to power reception coil 11.

In FIG. 7, therefore, the temperatures of the contact portions of undercovers 71, 73 fixed with fixing members 81a, 85a are higher than the temperatures of the connected portions of cushion members 93A, 93B with support portions 94A, 94B. The temperatures of the contact portions of undercovers 71, 73 fixed with fixing members 81a, 85a are higher than the temperatures of the contact portions of fixing members 101a, 103a in contact with floor panel 70.

Figure 20:
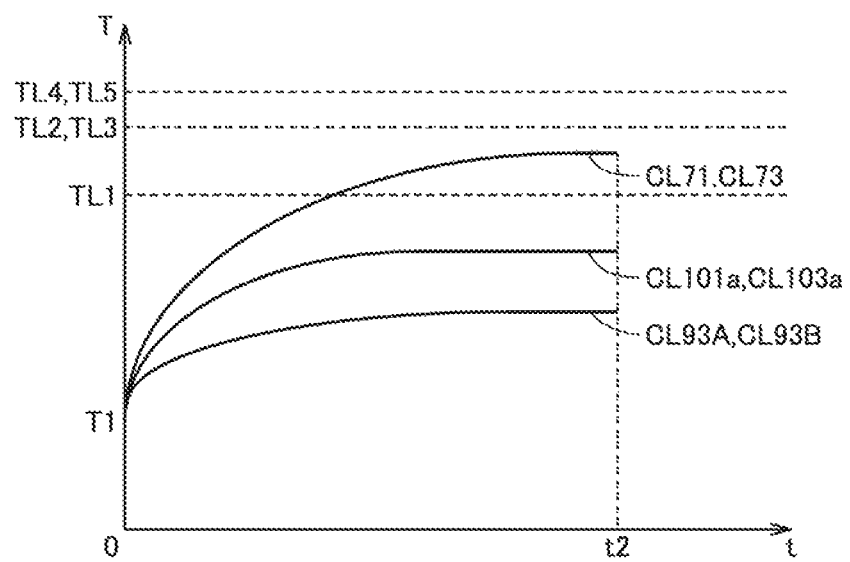
FIG. 20 is a graph showing a predictive temperature of each of the members during the period from the start of power transmission from power transmission coil 25 to the completion of battery charging, when power reception coil 11 and power transmission coil 25 are arranged as shown in FIG. 17.

FIG. 20 is a graph showing a predictive temperature of each of the members during the period from the start of power transmission from power transmission coil 25 to power reception coil 11, to the completion of battery charging, when power reception coil 11 and power transmission coil 25 are arranged as shown in FIG. 17. As shown in the graph of FIG. 20, the temperatures of temperature curves CL71, CL73 are higher than the temperatures of temperature curves CL101a, CL103a and the temperatures of temperature curves CL93A, CL93B. The temperatures of temperature curves CL93A, CL93B are lower than the temperatures of temperature curves CL101a, CL103a.

Now, from a comparison between the graph shown in FIG. 20 and the graph shown in FIG. 15, it is seen that the temperatures of temperature curves CL71, CL73 shown in FIG. 20 are higher than the temperatures of temperature curves CL71, CL73 shown in FIG. 15. This is because the amount of incoming magnetic flux into floor panel 70 on the side of forward direction F relative to power reception coil 11 with central position C2 of power reception coil 11 being displaced in forward direction F relative to central position C1 of power transmission coil 25 is greater than that with central position C1 and central position C2 being aligned, when power reception coil 11 and power transmission coil 25 are viewed from below power transmission coil 25.

Similarly, from a comparison between the graph shown in FIG. 14 and the graph shown in FIG. 19, it is seen that the temperatures of temperature curves CLA, CLB, and CLC shown in FIG. 14 are higher than the temperatures of temperature curves CLA, CLB, and CLC shown in FIG. 19. That is, it is seen that when power reception coil 11 is displaced in forward direction F relative to power transmission coil 25, the detection temperatures of temperature detection devices 58A, 58B, and 58C arranged on the side of forward direction F relative to power reception coil 11 increase, as with the temperatures of the contact portions of undercovers 71, 73 located on the side of forward direction F relative to power reception coil 11.

In the example shown in FIG. 20, the temperatures of temperature curves CL71, CL73 exceed heat-resistant temperature TL1 of undercovers 71, 73. Note that the temperatures of temperature curves CL101a, CL103a do not exceed heat-resistant temperatures TL2, TL3, respectively. The temperatures of temperature curves CL93A, CL93B do not exceed heat-resistant temperatures TL4, TL5, respectively.

Figure 21:
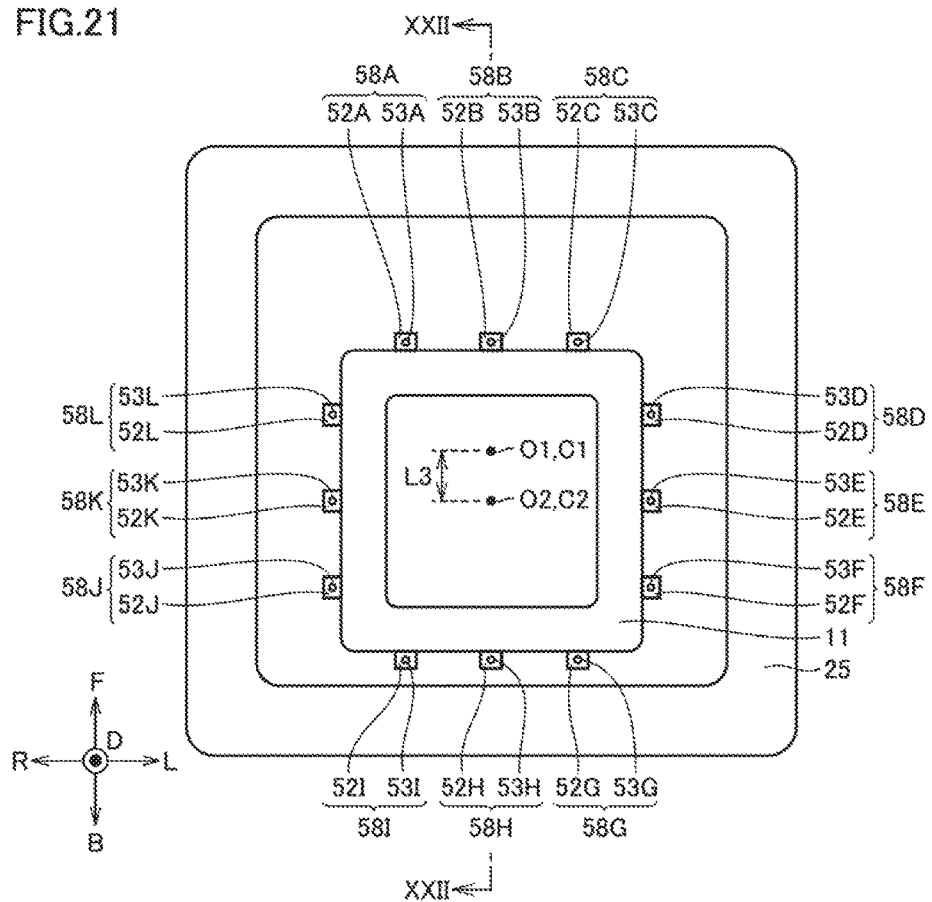
FIG. 21 is a bottom view showing a state in which power reception coil 11 has been moved a distance L3 horizontally in a backward direction B with reference to power transmission coil 25, with power reception coil 11 and power transmission coil 25 being vertically apart from each other at prescribed distance L1.
Figure 22:
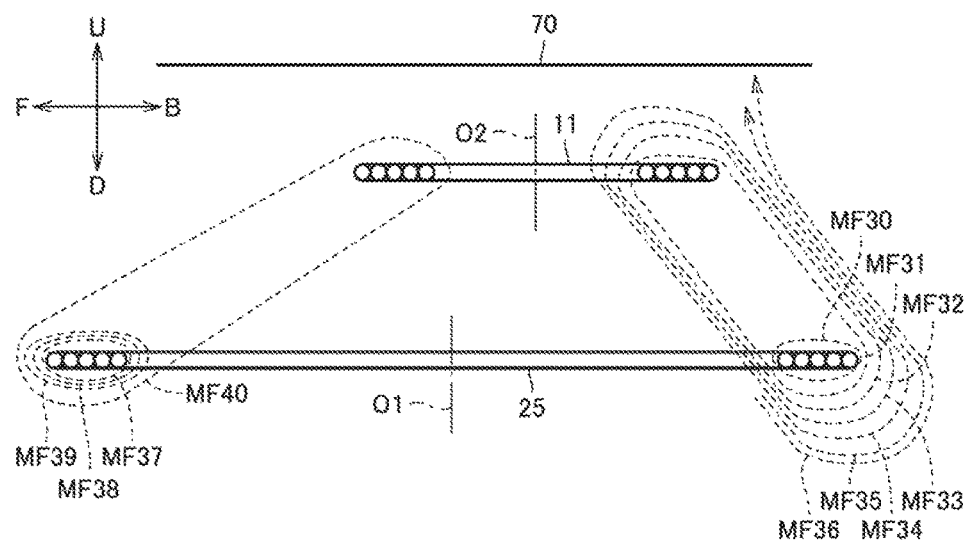
FIG. 22 is a cross-sectional view along line XXII-XXII shown in FIG. 21.
Figure 23:
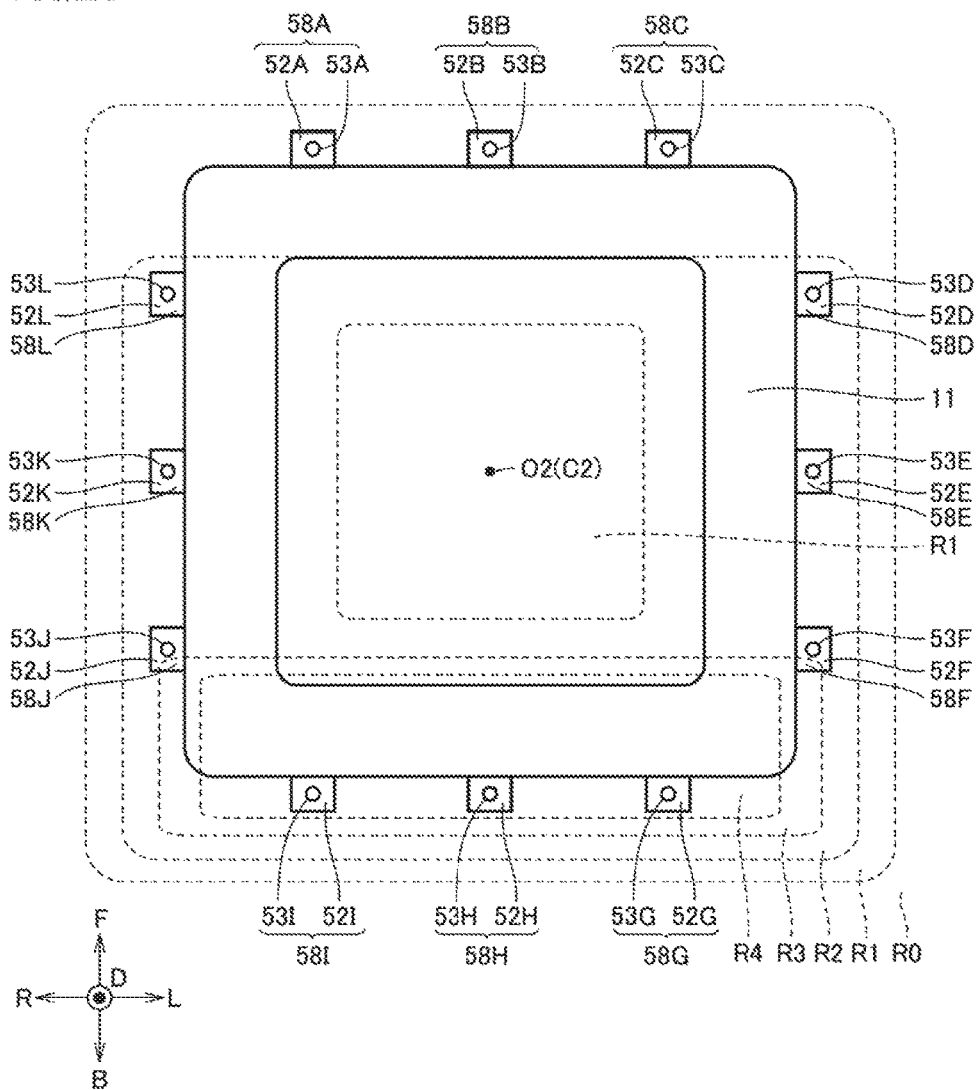
FIG. 23 is a bottom view of power reception coil 11 and power transmission coil 25 when viewed from below the power transmission coil.

FIG. 21 is a plan view of power reception coil 11 and power transmission coil 25 when viewed from below power reception coil 11 and power transmission coil 25. The state shown in FIG. 21 corresponds to a bottom view showing a state in which power reception coil 11 is displaced a distance L3 in backward direction B with reference to power transmission coil 25, with power reception coil 11 and power transmission coil 25 being vertically apart from each other at prescribed distance L1. In this case, the displacement direction is backward direction B. As shown in FIG. 21, winding axis O2 of power reception coil 11 has been moved in backward direction B with reference to winding axis O1 of power transmission coil 25, such that the portion on the side of backward direction B of power reception coil 11 is closer to the portion on the side of backward direction B of power transmission coil 25, as shown in FIG. 22. On the other hand, the portion on the side of forward direction F of power reception coil 11 is more distant from the portion on the side of forward direction F of power transmission coil 25. As shown in FIG. 23, therefore, the magnetic field strength is higher on the side of backward direction B of power reception coil 11, while the magnetic field strength is lower on the side of forward direction F of power reception coil 11.

Figure 24:
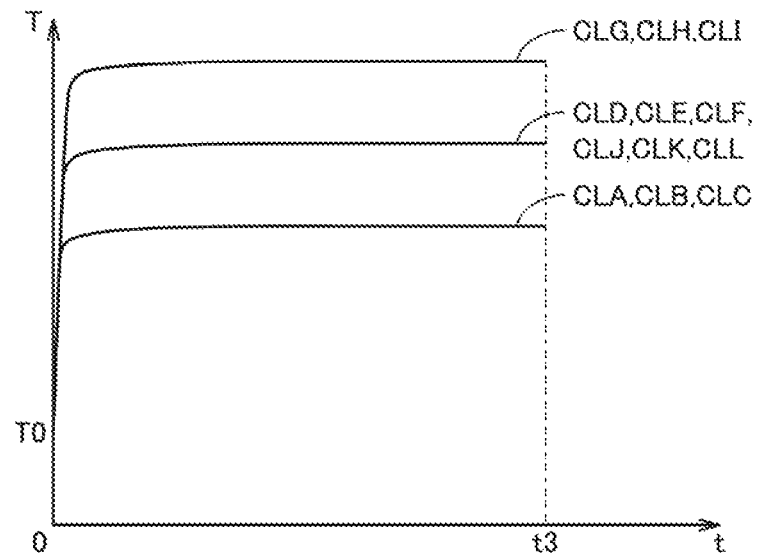
FIG. 24 is a graph conceptually showing a predictive value of a detection temperature from each of temperature sensors 53A to 53L during the period from the start of power transmission from power transmission coil 25 to the completion of battery charging, when power reception coil 11 and power transmission coil 25 are arranged as shown in FIG. 21.

As shown in FIG. 24, therefore, temperature curves CLG, CLH, and CLI of predictive detection temperatures from temperature sensors 53G, 53H, and 53I are higher than temperature curves CLA, CLB, and CLC of predictive detection temperatures from temperature sensors 53A, 53B, and 53C.

In FIGS. 14 and 24, the temperatures of temperature curves CLG, CLH, and CLI shown in FIG. 24 are higher than the temperatures of temperature curves CLG, CLH, and CLI shown in FIG. 14. It is thus seen that the temperatures of metal pieces 52G, 52H, and 52I located on the side of backward direction B relative to power reception coil 11 become higher when power reception coil 11 is displaced in backward direction B relative to power transmission coil 25.

Because the magnetic field strength is higher on the side of backward direction B of power reception coil 11 as shown in FIG. 23, more magnetic fluxes MF35, MF36 enter floor panel 70 on the side of backward direction B relative to power reception coil 11, as shown in FIG. 22.

The amount of incoming magnetic flux into the portion of floor panel 70 located on the side of backward direction B relative to power reception coil 11 is greater than the amount of incoming magnetic flux into the portion of floor panel 70 located on any side of forward direction F, left direction L, and right direction R relative to power reception coil 11.

In FIG. 7, therefore, the temperatures of the connected portions of cushion members 93A, 93B with support portions 94A, 94B are higher than the temperatures of the contact portions of undercovers 71, 73 fixed with fixing members 81a and 85a. Moreover, the temperatures of the connected portions of cushion members 93A, 93B with support portions 94A, 94B are higher than the temperatures of the contact portions of fixing members 101a, 103a in contact with floor panel 70.

Figure 25:
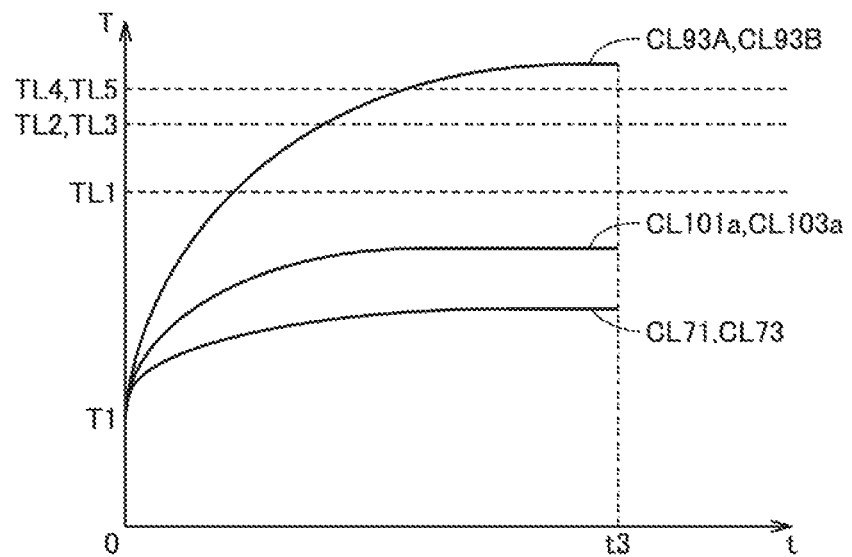
FIG. 25 is a graph conceptually showing a predictive temperature of each of the members during the period from the start of power transmission from power transmission coil 25 to the completion of battery charging, when power reception coil 11 and power transmission coil 25 are arranged as shown in FIG. 21.

As shown in the graph of FIG. 25, the predictive temperatures shown by temperature curves CL93A, CL93B are higher than the predictive temperatures shown by temperature curves CL71, CL73 and temperature curves CL101a, and CL103a.

From a comparison between the graph shown in FIG. 25 and the graph shown in FIG. 15, it is seen that the temperatures of temperature curves CL93A, CL93B in FIG. 25 are higher than the temperatures of temperature curves CL93A, CL93B shown in FIG. 15. From a comparison between the graph shown in FIG. 14 and the graph shown in FIG. 24, it is seen that the detection temperatures of temperature detection devices 58G, 58H, and 58I (temperature curves CLG, CLH, and CLI) shown in FIG. 24 are higher than the detection temperatures of temperature detection devices 58G, 58H, and 58I shown in FIG. 14.

That is, it is seen that when power reception coil 11 is displaced in backward direction B relative to power transmission coil 25, the detection temperatures of temperature detection devices 58G, 58H, and 58I located on the side of backward direction B relative to power reception coil 11 increase, as with the temperatures of the connected portions of cushion members 93A, 93B located on the side of backward direction B relative to power reception coil 11. Note that in the example shown in FIG. 25, temperature curves CL93A, CL93B exceed heat-resistant temperatures TL4, TL5 of cushion members 93A, 93B.

Figure 26:
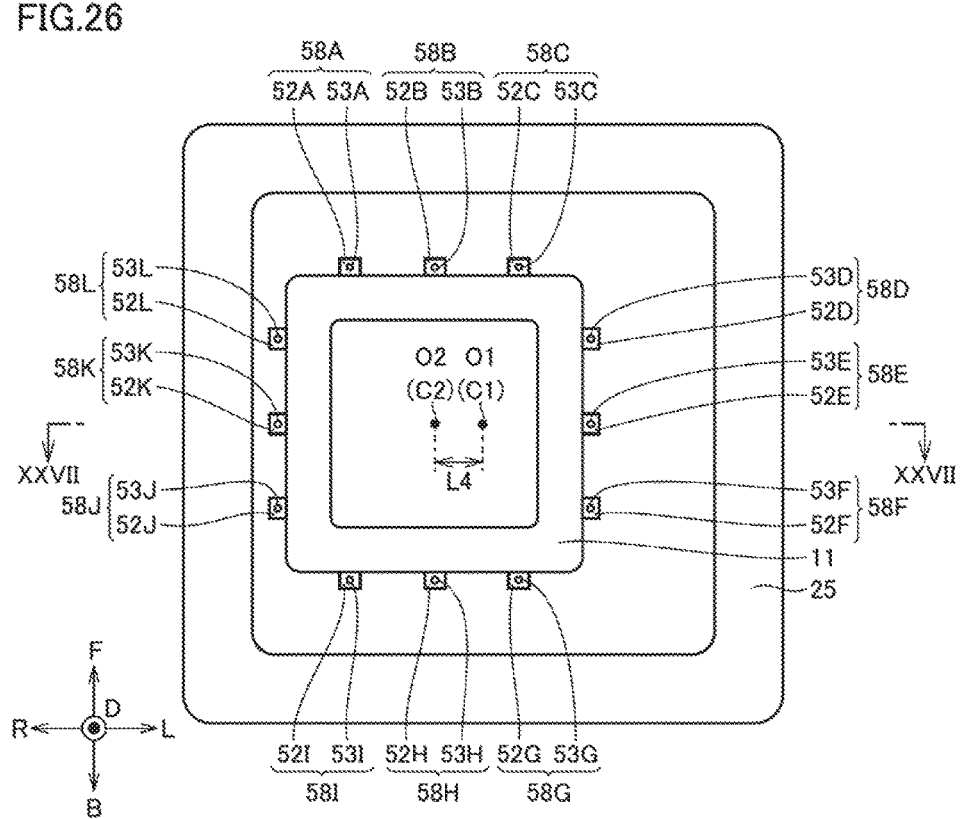
FIG. 26 is a bottom view showing a state in which power reception coil 11 has been moved a distance L4 horizontally in a right direction R with reference to power transmission coil 25, with power reception coil 11 and power transmission coil 25 being vertically apart from each other at prescribed distance L1.
Figure 27:
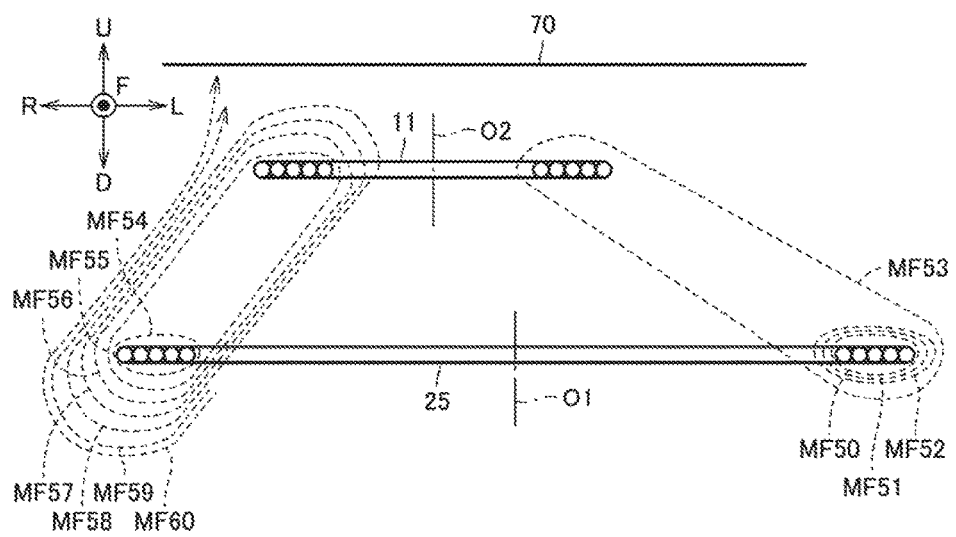
FIG. 27 is a cross-sectional view along line XXVII-XXVII shown in FIG. 26.

FIG. 26 is a bottom view showing a state in which power reception coil 11 is displaced a distance L4 in right direction R with reference to power transmission coil 25, with power reception coil 11 and power transmission coil 25 being vertically apart from each other at prescribed distance L1. As shown in FIG. 26, winding axis O2 of power reception coil 11 is displaced in right direction R with reference to winding axis O1 of power transmission coil 25. In this case, the displacement direction is right direction R. The portion on the side of right direction R of power reception coil 11 is closer to the portion on the side of right direction R of power transmission coil 25, as shown in FIG. 27. On the other hand, the portion on the side of left direction L of power reception coil 11 is more distant from the portion on the side of left direction L of power transmission coil 25.

Because the distance between the portion on the side of right direction R of power reception coil 11 and the portion on the side of right direction R of power transmission coil 25 is shorter, more magnetic fluxes MF55 to MF58 pass through power reception coil 11 and power transmission coil 25, between the portion on the side of right direction R of power reception coil 11 and the portion on the side of right direction R of power transmission coil 25. On the other hand, only a small amount of a magnetic flux MF53 passes through power reception coil 11 and power transmission coil 25, between the portion on the side of left direction L of power reception coil 11 and the portion on the side of left direction L of power transmission coil 25.

Figure 28:
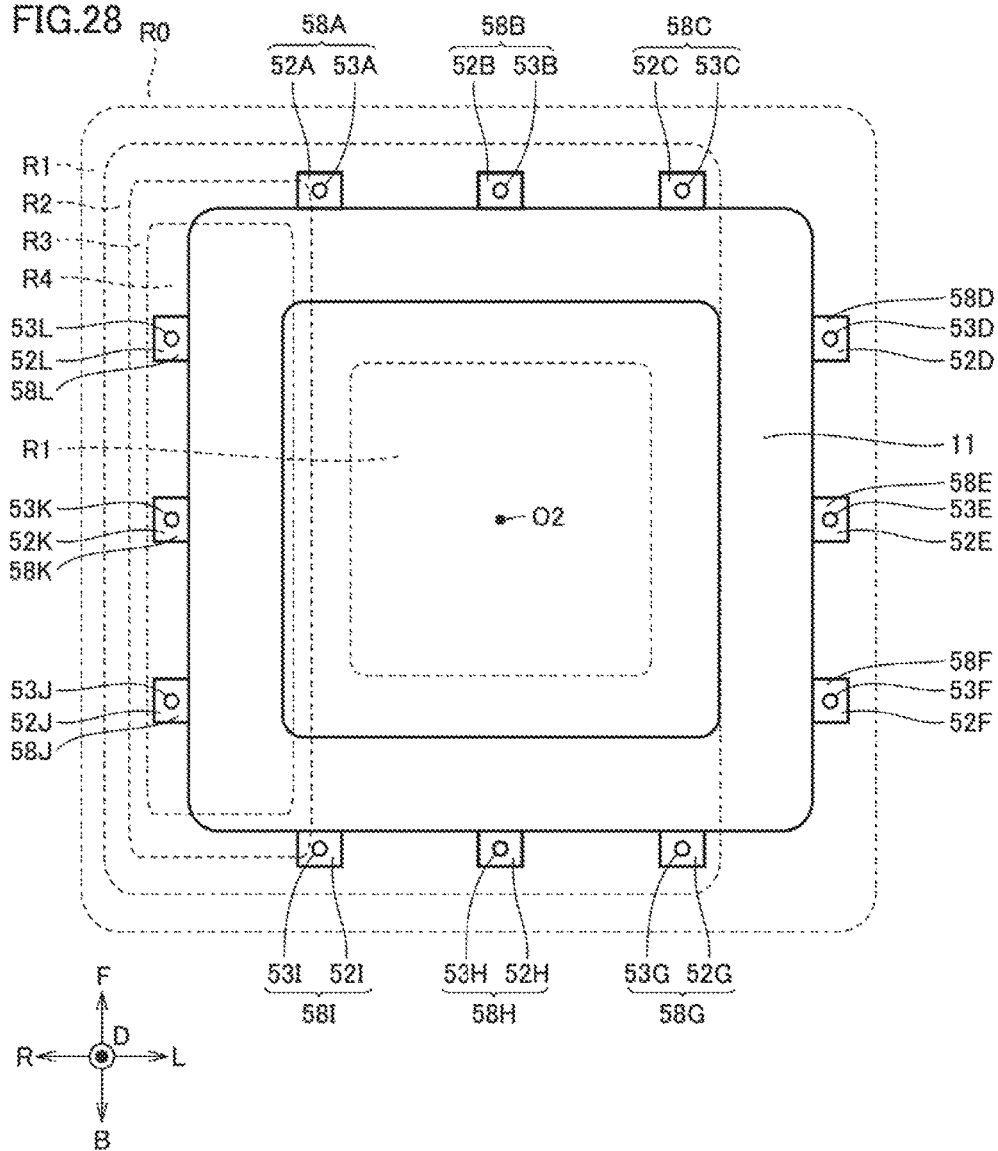
FIG. 28 is a bottom view of power reception coil 11 and power transmission coil 25 when viewed from below the power transmission coil.

As shown in FIG. 28, therefore, the magnetic field strength is higher on the side of right direction R of power reception coil 11, while the magnetic field strength is lower on the side of left direction L of power reception coil 11. Note that the magnetic field strength increases from region R0 toward region R4.

Figure 29:
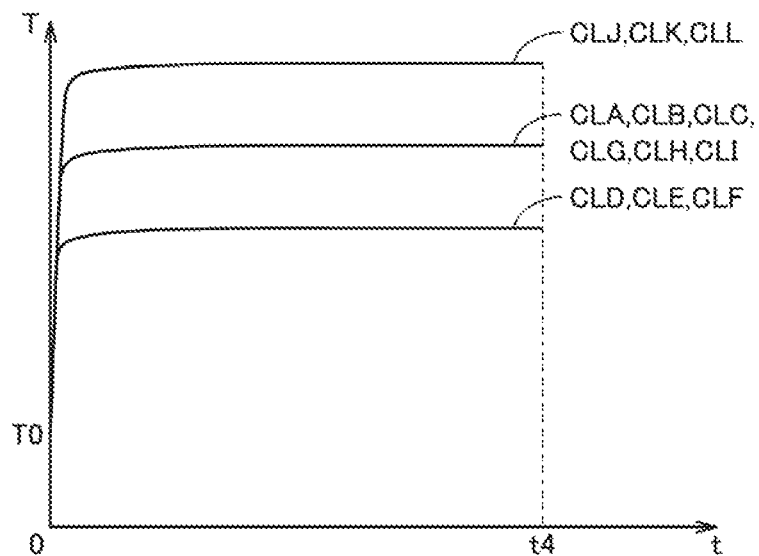
FIG. 29 is a graph conceptually showing a predictive value of a detection temperature from each of temperature sensors 53A to 53L during the period from the start of power transmission from power transmission coil 25 to the completion of battery charging, when power reception coil 11 and power transmission coil 25 are arranged as shown in FIG. 27.

Therefore, as shown in FIG. 29, temperature curves CLJ, CLK, and CLL of predictive detection temperatures from temperature sensors 53J, 53K, and 53L are higher than temperature curves CLD, CLE, and CLF of predictive detection temperatures from temperature sensors 53D, 53E, and 53F.

In FIGS. 14 and 29, the predictive temperatures shown by temperature curves CLJ, CLK, and CLL shown in FIG. 29 are higher than the predictive temperatures of temperature curves CLJ, CLK, and CLL shown in FIG. 14.

As shown in FIG. 28, because the magnetic field strength is higher on the side of right direction R of power reception coil 11, the amount of incoming magnetic flux into the portion of floor panel 70 located on the side of right direction R relative to power reception coil 11 is greater than the amount of incoming magnetic flux into the portion of floor panel 70 located on the side of left direction L relative to power reception coil 11.

Figure 30:
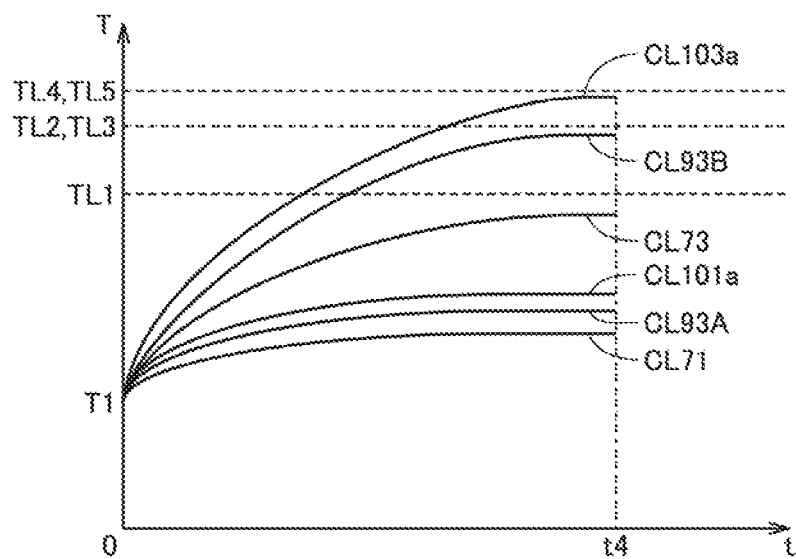
FIG. 30 is a graph showing change in the temperature of each of the members during the period from the start of power transmission from power transmission coil 25 to power reception coil 11, to the completion of battery charging, when power reception coil 11 and power transmission coil 25 are arranged as shown in FIG. 27.

In FIG. 7, therefore, the predictive temperature of the contact portion of fixing member 103a in contact with floor panel 70 is higher than that of the contact portion of fixing member 101a in contact with floor panel 70. In FIG. 30, the temperature of temperature curve CL103a is higher than the temperature of temperature curve CL101a.

Now, from a comparison between the graph shown in FIG. 30 and the graph shown in FIG. 15, it is seen that the predictive temperatures shown by temperature curves CL103a, CL93B, and CL73 in FIG. 30 are higher than the predictive temperatures shown by temperature curves CL103a, CL93B, and CL73 in FIG. 15. This is because the amount of incoming magnetic flux into floor panel 70 on the side of right direction R relative to power reception coil 11 when power reception coil 11 receives power while being displaced in right direction R relative to power transmission coil 25 is greater than that when power reception coil 11 receives power with power reception coil 11 and power transmission coil 25 being aligned to each other.

As shown in FIGS. 14, 15, 29, and 30, when power reception coil 11 is displaced in right direction R relative to power transmission coil 25, the detection temperatures of temperature detection devices 58J, 58K, and 58L located on the side of right direction R relative to power reception coil 11 increase, as with the temperatures of fixing member 103a, the connected portion of cushion member 93B, and the contact portion of undercover 73 which are located on the side of right direction R relative to power reception coil 11.

Figure 31:
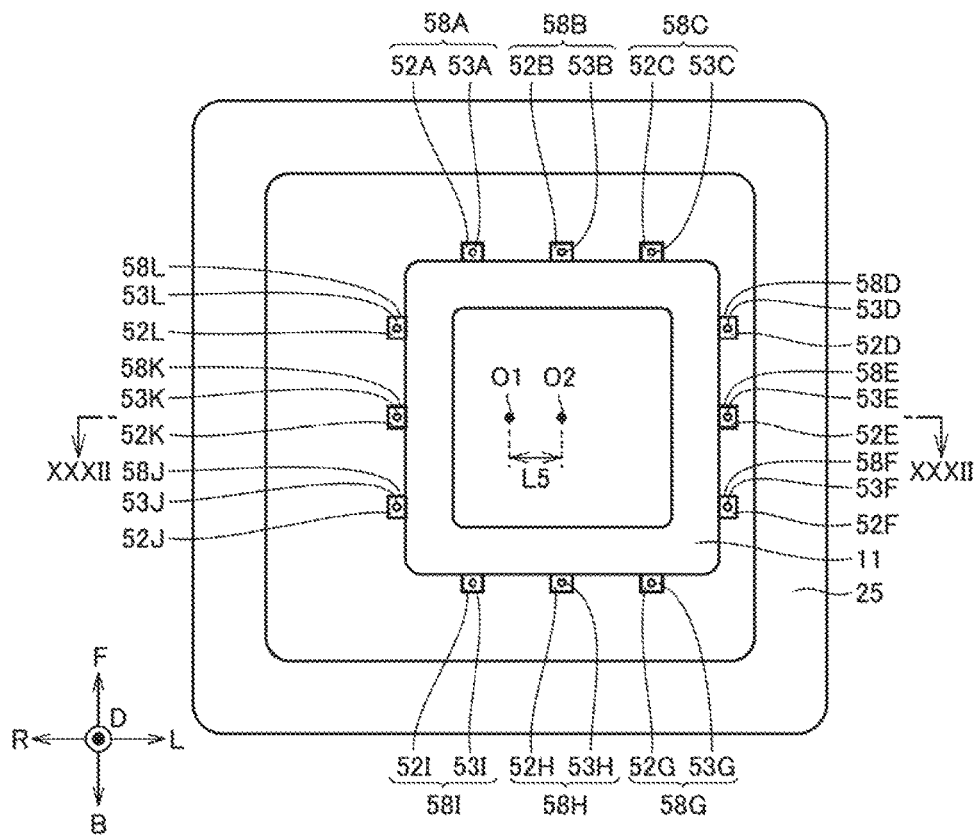
FIG. 31 is a bottom view showing a state in which power reception coil 11 has been moved a distance L5 horizontally in a left direction L with reference to power transmission coil 25, with power reception coil 11 and power transmission coil 25 being vertically apart from each other at prescribed distance L1.
Figure 32:
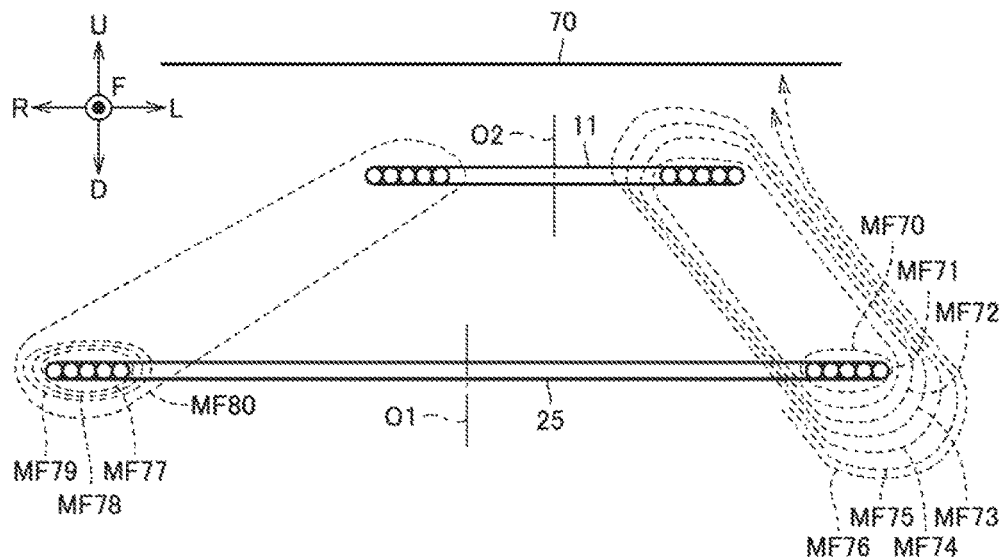
FIG. 32 is a cross-sectional view along line XXXII-XXXII shown in FIG. 31.

FIG. 31 is a bottom view showing a state in which power reception coil 11 is displaced a distance L5 in left direction L with reference to power transmission coil 25, with power reception coil 11 and power transmission coil 25 being vertically apart from each other at prescribed distance L1. In this case, the displacement direction is left direction L. As shown in FIG. 31, winding axis O2 of power reception coil 11 is displaced in left direction L with reference to winding axis O1 of power transmission coil 25, such that the portion on the side of left direction L of power reception coil 11 is closer to the portion on the side of left direction L of power transmission coil 25, as shown in FIG. 32. On the other hand, the portion on the side of right direction R of power reception coil 11 is more distant from the portion on the side of right direction R of power transmission coil 25.

Figure 33:
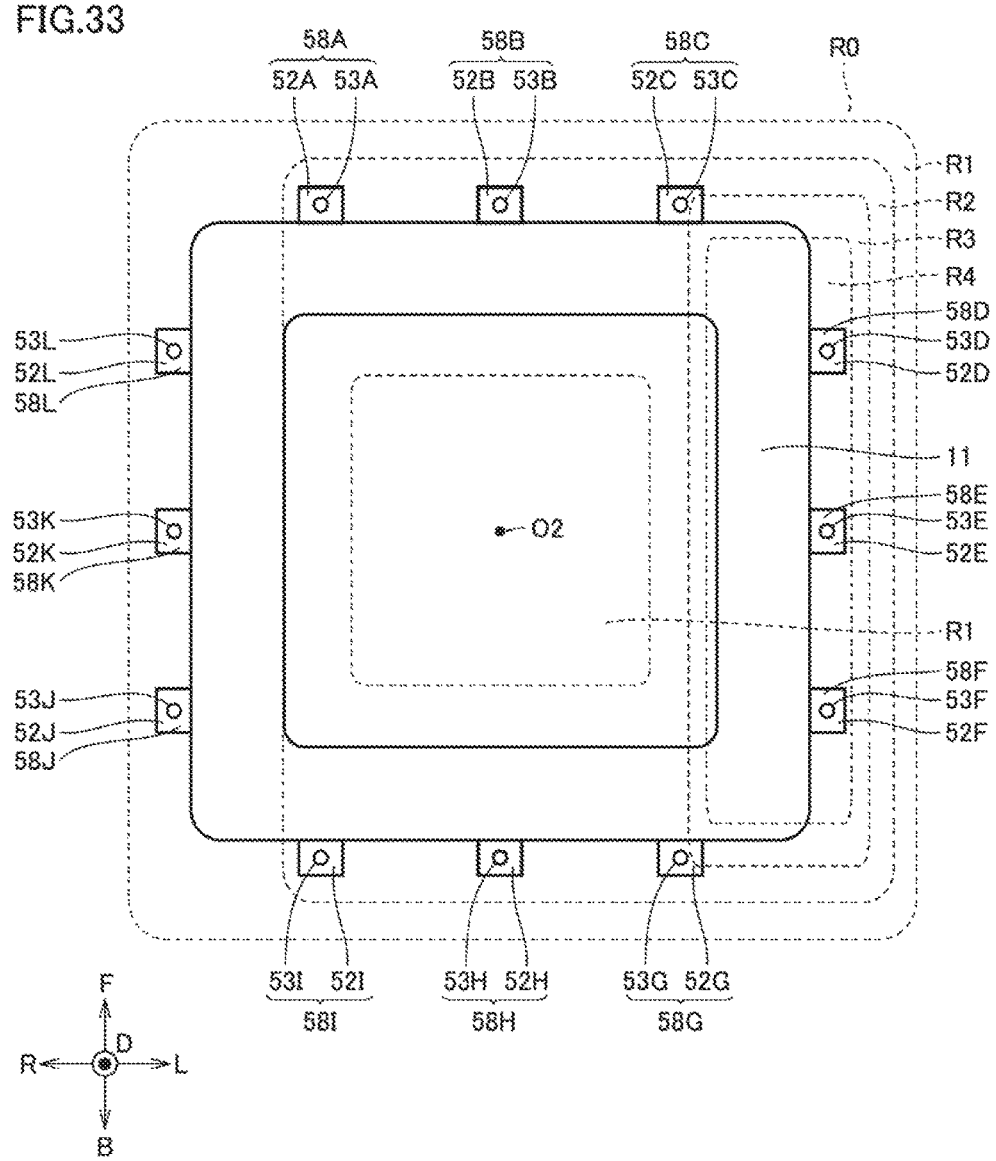
FIG. 33 is a bottom view of power reception coil 11 and power transmission coil 25 when viewed from below the power transmission coil.

As shown in FIG. 33, therefore, the magnetic field strength of the portion on the side of left direction L of power reception coil 11 is higher than that of the portion of power reception coil 11 on any of the forward direction F side, the right direction R side, and the backward direction B side.

Figure 34:
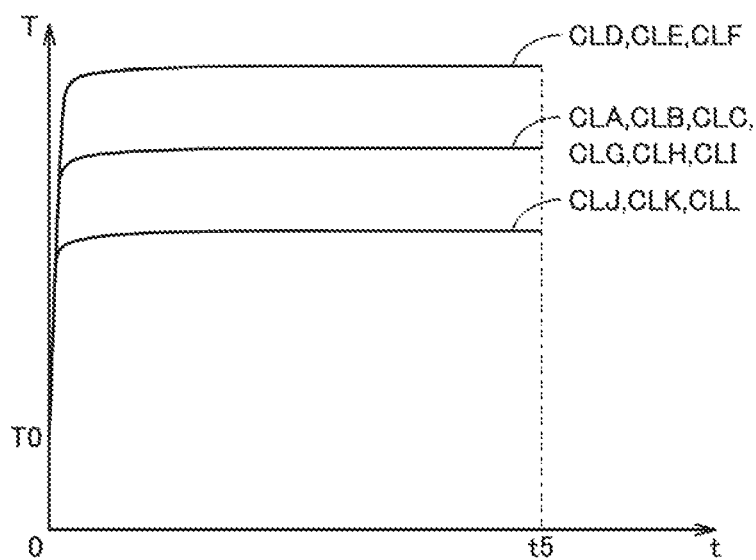
FIG. 34 is a graph conceptually showing a predictive value of a detection temperature from each of temperature sensors 53A to 53L during the period from the start of power transmission from power transmission coil 25 to the completion of battery charging, when power reception coil 11 and power transmission coil 25 are arranged as shown in FIG. 31.

As shown in FIG. 34, therefore, temperature curves CLD, CLE, and CLF of predictive detection temperatures of temperature sensors 53D, 53E, and 53F are higher than temperature curves CLA, CLB, CLC, CLG, CLH, CLI, CLJ, CLK, and CLL of predictive temperatures of temperature sensors 53A, 53B, 53C, 53G, 53H, 53I, 53J, 53K, and 53L.

As shown in FIG. 33, because the magnetic field strength is higher on the side of left direction L of power reception coil 11, the amount of incoming magnetic flux into the portion of floor panel 70 located on the side of left direction L relative to power reception coil 11 is greater than the amount of incoming magnetic flux into the portion of floor panel 70 located on the side of right direction R relative to power reception coil 11.

Figure 35:
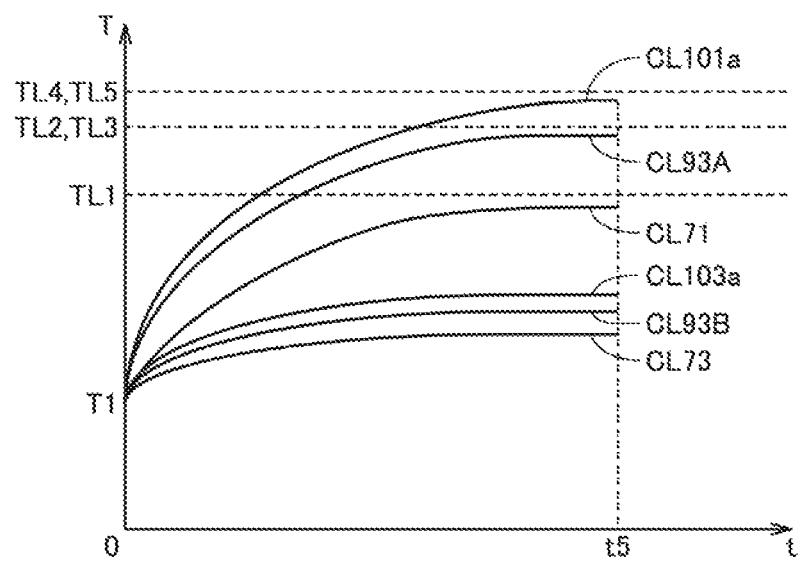
FIG. 35 is a graph showing change in the temperature of each of the members during the period from the start of power transmission from power transmission coil 25 to power reception coil 11, to the completion of battery charging, when power reception coil 11 and power transmission coil 25 are arranged as shown in FIG. 31.

In FIG. 7, therefore, the temperature of the contact portion of fixing member 101a in contact with floor panel 70 is higher than the temperature of the contact portion of fixing member 103a in contact with floor panel 70. In FIG. 35, the temperature of temperature curve CL101a is higher than the temperature of temperature curve CL103a.

Now, from a comparison between the graph shown in FIG. 35 and the graph shown in FIG. 15, it is seen that the temperatures of temperature curves CL101a, CL93A, CL71 shown in FIG. 35 are higher than the temperatures of temperature curves CL101a, CL93A, and CL71 shown in FIG. 15. This is because the amount of incoming magnetic flux into floor panel 70 on the side of left direction L relative to power reception coil 11 when power reception coil 11 receives power while being displaced in left direction L relative to power transmission coil 25 is greater than that when power reception coil 11 receives power with power reception coil 11 and power transmission coil 25 being aligned to each other.

As shown in FIGS. 14, 15, 34, and 35, the detection temperatures of temperature detection devices 58D, 58E, and 58F located on the side of left direction L relative to power reception coil 11 increase, as with the temperatures of the contact portion of fixing member 101a, the connected portion of cushion member 93A, and the contact portion of undercover 71 which are located on the side of left direction L relative to power reception coil 11. Note that in the example shown in FIG. 35, temperature curve CL101a exceeds heat-resistant temperature TL2.

As shown in FIGS. 16, 21, 26, and 31, power reception coil 11 can receive power in a plurality of displacement directions (for example, forward direction F, backward direction B, left direction L, and right direction R) relative to power transmission coil 25 when it is viewed from below power transmission coil 25.

The contact portions of undercovers 71, 73 are located on the side of forward direction F relative to power reception coil 11. Cushion members 93A, 93B are located on the side of backward direction B relative to power reception coil 11. Fixing member 101a is located on the side of left direction L relative to power reception coil 11, and fixing member 103a is located on the side of right direction R relative to power reception coil 11.

Temperature detection devices 58A to 58C are provided on the side of forward direction F relative to power reception coil 11, and temperature detection devices 58G to 58I are provided on the side of backward direction B relative to power reception coil 11. Temperature detection devices 58D to 58F are provided on the side of left direction L relative to power reception coil 11, and temperature detection devices 58J to 58L are provided on the side of right direction R relative to power reception coil 11.

As shown in FIGS. 19, 20, 24, 25, 29, 30, 34, and 35, when power reception coil 11 is displaced relative to power transmission coil 25, the temperatures of the members provided on the side toward the direction of displacement of power reception coil 11 increase significantly as compared to the temperatures of other members. When power reception coil 11 is displaced relative to power transmission coil 25, the detection temperatures of those of the plurality of temperature detection devices 58 arranged on the side toward any of the above-described displacement directions of power reception coil 11 increase as with the temperatures of the members provided on the side toward the direction of the displacement.

That is, it is seen that the temperatures of a plurality of members provided on floor panel 70 can be detected by detecting the detection temperatures of the plurality of temperature detection devices 58 provided around power reception coil 11. In this embodiment, therefore, the threshold temperature is set for each of temperature detection devices 58 in accordance with the heat resistance of each member provided on floor panel 70, so as to prevent the temperature of that member provided on floor panel 7 from exceeding the heat-resistant temperature during charging.

While the temperature of each member is predicted with each temperature detection device 58 accommodated within power reception device 8 in this embodiment, each temperature detection device may be directly mounted on the contact portion of each of undercovers 71 and 73, the connected portion of each of cushion members 93A and 93B, or each of fixing members 101a and 103a.

A method for setting the threshold temperature for each temperature detection device 58 will be described next.

Figure 36:
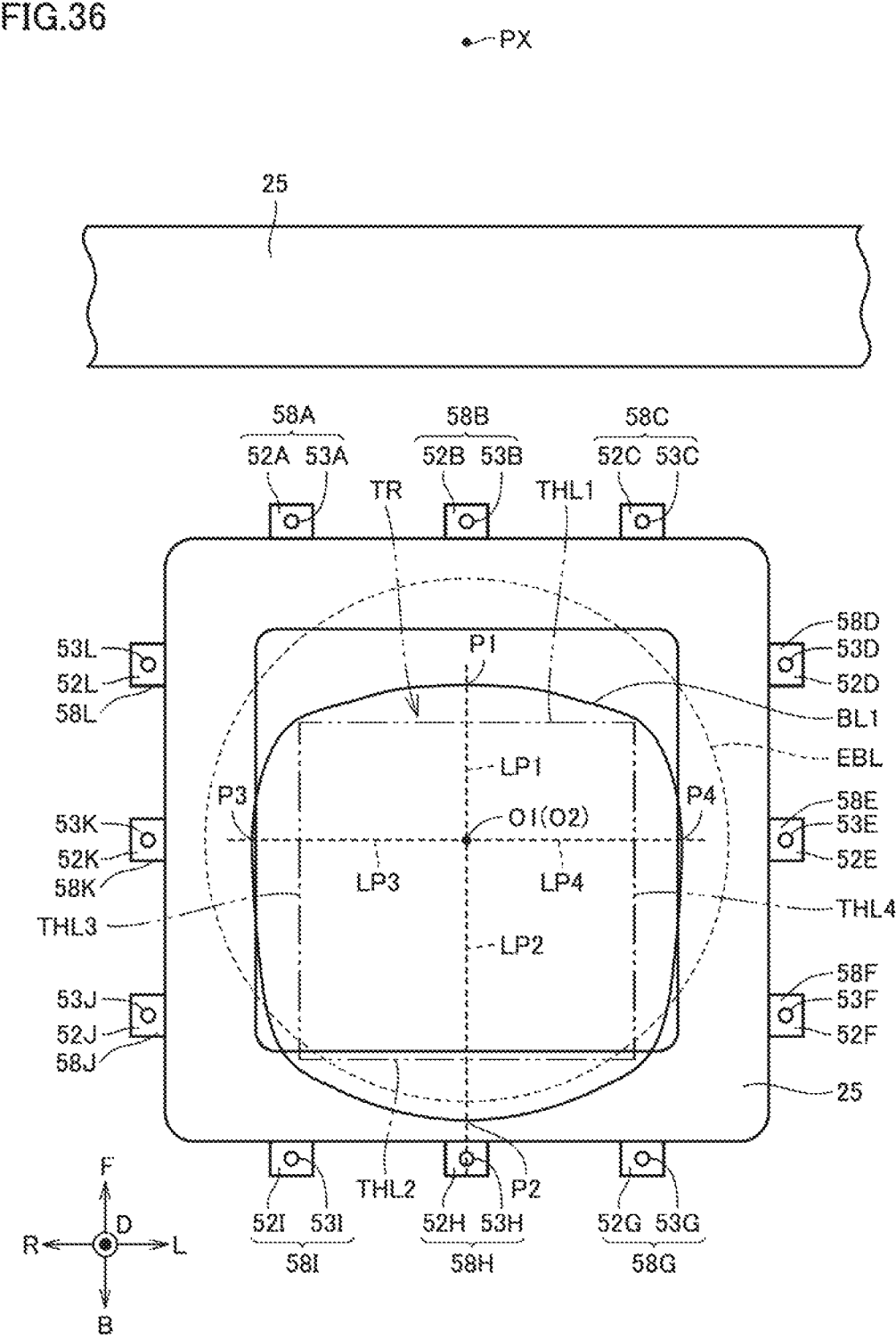
FIG. 36 is a bottom view showing power reception coil 11 and power transmission coil 25.

FIG. 36 is a bottom view showing power reception coil 11 and power transmission coil 25. The bottom view in FIG. 36 shows a state in which power reception coil 11 and power transmission coil 25 are vertically apart from each other at prescribed distance L1. A boundary line BL1 shown in FIG. 36 represents a boundary line where the temperature of any of undercovers 71, 73, cushion members 93A, 93B, and fixing members 101a, 103a exceeds the heat-resistant temperature during the period from the start to the completion of charging between power reception coil 11 and power transmission coil 25.

If power reception coil 11 receives power from power transmission coil 25 with winding axis O2 of power reception coil 11 being located on or outside boundary line BL1, the temperature of any portion or member of the contact portions of undercovers 71, 73 where fixing members 81*a*, 85*a* are fixed, the connected portions of cushion members 93A, 93B with support portions 94A, 94B, and the contact portions of fixing members 101*a*, 103*a* with floor panel 70 exceeds the heat-resistant temperature of that portion or member.

A measurement position P1 is located on boundary line BL1 on the side of forward direction F relative to winding axis O1 of power transmission coil 25. A measurement position P2 is located on boundary line BL1 on the side of backward direction B relative to winding axis O1 as a reference position. A measurement position P3 is located on boundary line BL1 on the side of right direction R relative to winding axis O1 as the reference position. A measurement position P4 is located on the side of left direction L relative to winding axis O1 as the reference position.

Measurement position P1 is apart from winding axis O1 at a distance LP1 in forward direction F, and measurement position P2 is apart from winding axis O1 at a distance LP2 in backward direction B. Measurement position P3 is apart from winding axis O1 at a distance LP3 in right direction R, and measurement position P4 is apart from winding axis O1 at a distance LP4 in left direction L. Distance LP2 is longer than distances LP1, LP3, and LP4, while distances LP3, LP4 are longer than distance LP1.

If power transfer from power transmission coil 25 to power reception coil 11 is started with power reception coil 11 being arranged such that winding axis O2 is located in measurement position P1, the temperatures of the contact portions of undercovers 71, 73 fixed with fixing members 81*a*, 83*a* shown in FIG. 7 exceed the heat-resistant temperature of undercovers 71, 73 during the period from the start to the completion of charging.

Moreover, if power transfer from power transmission coil 25 to power reception coil 11 is started with power reception coil 11 being arranged such that winding axis O2 is located in measurement position P1, the highest temperature of metal pieces 52A, 52B, and 52C is reached after a prescribed period passes. The highest temperature at this time is defined as a highest temperature HT1.

In FIG. 36, if power transfer from power transmission coil 25 to power reception coil 11 is started with power reception coil 11 being arranged such that winding axis O2 is located in measurement position P2, the temperatures of the connected portions of cushion members 93A, 93B connected with support portions 94A, 95B shown in FIG. 7 exceed the heat-resistant temperatures of cushion members 93A, 93B during the period from the start to the completion of charging.

Moreover, if power transfer from power transmission coil 25 to power reception coil 11 is started with power reception coil 11 being arranged such that winding axis O2 is located in measurement position P2, the highest temperature of metal pieces 52G, 52J, and 52I is reached after a prescribed period passes. The highest temperature at this time is defined as a highest temperature HT2.

If power transfer from power transmission coil 25 to power reception coil 11 is started with power reception coil 11 being arranged such that winding axis 2 is located in measurement position P3, the temperature of the contact portion of fixing member 103*a* in contact with floor panel 70 shown in FIG. 7 exceeds the heat-resistant temperature of fixing member 103*a* during the period from the start to the completion of charging.

Moreover, if power transfer from power transmission coil 25 to power reception coil 11 is started with power reception coil 11 being arranged such that winding axis O2 is located in measurement position P3, the highest temperature of metal pieces 52J, 52K, and 52L is reached after a prescribed period passes. The highest temperature at this time is defined as a highest temperature HT3.

If power transfer from power transmission coil 25 to power reception coil 11 is started with power reception coil 11 being arranged such that winding axis O2 is located in measurement position P4, the temperature of the contact portion of fixing member 101*a* in contact with floor panel 70 shown in FIG. 7 exceeds the heat-resistant temperature of fixing member 101*a* during the period from the start to the completion of charging.

Moreover, if power transfer from power transmission coil 25 to power reception coil 11 is started with power reception coil 11 being arranged such that winding axis O2 is located in measurement position P4, the highest temperature of metal pieces 52D, 52E, and 52F is reached after a prescribed period passes. The highest temperature at this time is defined as a highest temperature HT4.

Note that distance LP1 is shorter than distance LP2. That is, when power reception coil 11 is displaced relative to power transmission coil 25, the temperatures of the contact portions of undercovers 71, 73 in contact with floor panel 70 are more likely to exceed the heat-resistant temperature than the temperatures of the connected portions of cushion members 93A, 93B, and thus, the heat resistance of undercovers 71, 73 is lower than that of cushion members 93A, 93B.

Distance LP1 is also shorter than distances LP3, LP4. That is, when power reception coil 11 is displaced relative to power transmission coil 25, the temperatures of the contact portions of undercovers 71, 73 are more likely to reach the heat-resistant temperature than the temperatures of the contact portion of fixing member 101*a* and the contact portion of fixing member 103*a*, and thus, the heat resistance of undercovers 71, 73 is lower than that of fixing members 101*a*, 103*a*.

Note that because distances LP3, LP4 are shorter than distance LP2, the heat resistance of fixing members 101*a*, 103*a* is lower than that of cushion members 93A, 93B.

When winding axis O2 of power reception coil 11 is located within the region surrounded by boundary line BL1 (not including the region on boundary line BL1), even if power transfer is started from power transmission coil 25 to power reception coil 11, the temperature of each of the resin members provided on floor panel 70 does not reach the heat-resistant temperature of each resin member during the period from the start to the completion of charging. The temperature of each of the metal pieces does not reach highest temperature HT1, HT2, or HT3.

A threshold region TR shown in FIG. 36 is set to be located within boundary line BL1. Threshold region TR is formed by a threshold line THL1 located on the side of forward direction F, a threshold line THL2 located on the side of backward direction B, a threshold line THL3 located on the side of right direction R, and a threshold line THL4 located on the side of left direction L.

Threshold line THL1 represents a position where the highest temperature of metal pieces 52A, 52B, and 52C reaches threshold temperature TH1 during the period from the start to the completion of charging, with power transmission coil 25 and power reception coil 11 being vertically apart from each other at prescribed distance L1. Threshold temperature TH1 is lower than highest temperature HT1.

Threshold line THL2 represents a position where the highest temperature of metal pieces 52G, 52H, and 52I reaches threshold temperature TH2 during the period from the start to the completion of charging, with power transmission coil 25 and power reception coil 11 being vertically apart from each other at prescribed distance L1. Threshold temperature TH2 is lower than highest temperature HT2.

Threshold line THL3 represents a position where the highest temperature of metal pieces 52J, 52K, and 52L reaches threshold temperature TH3 during the period from the start to the completion of charging, with power transmission coil 25 and power reception coil 11 being vertically apart from each other at prescribed distance L1. Threshold temperature TH3 is lower than highest temperature HT3. Threshold line THL4 represents a position where the highest temperature of metal pieces 52D, 52E, and 52F reaches threshold temperature TH4 during the period from the start to the completion of charging, with power transmission coil 25 and power reception coil 11 being vertically apart from each other at prescribed distance L1. Threshold temperature TH4 is lower than highest temperature HT4.

Note that the temperature of floor panel 70 during battery charging varies in accordance with the vertical distance between power reception coil 11 and power transmission coil 25, and this variation in temperature also affects the temperature of each of the members provided on floor panel 70.

Figure 37:
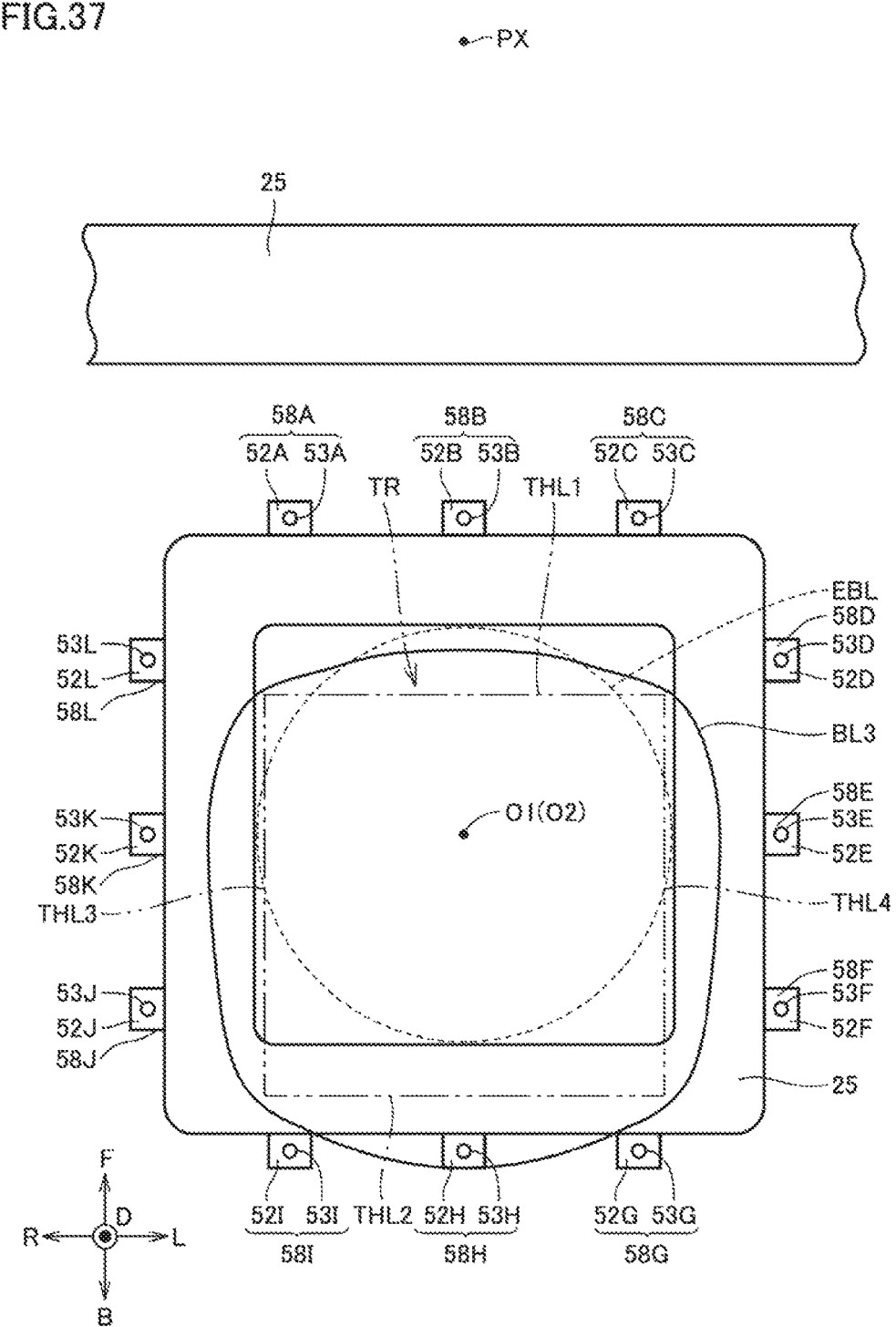
FIG. 37 is a bottom view of power reception coil 11 and power transmission coil 25 when viewed from below the power transmission coil.

In FIG. 37, a boundary line BL2 represents the boundary line when power reception coil 11 and power transmission coil 25 are vertically apart from each other at a prescribed distance L10. Note that prescribed distance L10 is longer than prescribed distance L1. Boundary line BL2 is substantially similar in shape to boundary line BL1, and greater than boundary line BL1. Because the distance between power reception coil 11 and power transmission coil 25 is longer, the amount of incoming magnetic flux into floor panel 70 is smaller. Therefore, the temperature of each of the members provided on floor panel 70 is less likely to increase.

When the distance between power reception coil 11 and power transmission coil 25 is longer, the amount of incoming magnetic flux into each of metal pieces 52A to 52L is smaller. The size of threshold region TR is thus greater than that at prescribed distance L1, although each of threshold temperatures TH1, TH2, TH3, and TH4 is not changed. In the example shown in FIG. 37, threshold region TR is located within boundary line BL2.

Figure 38:
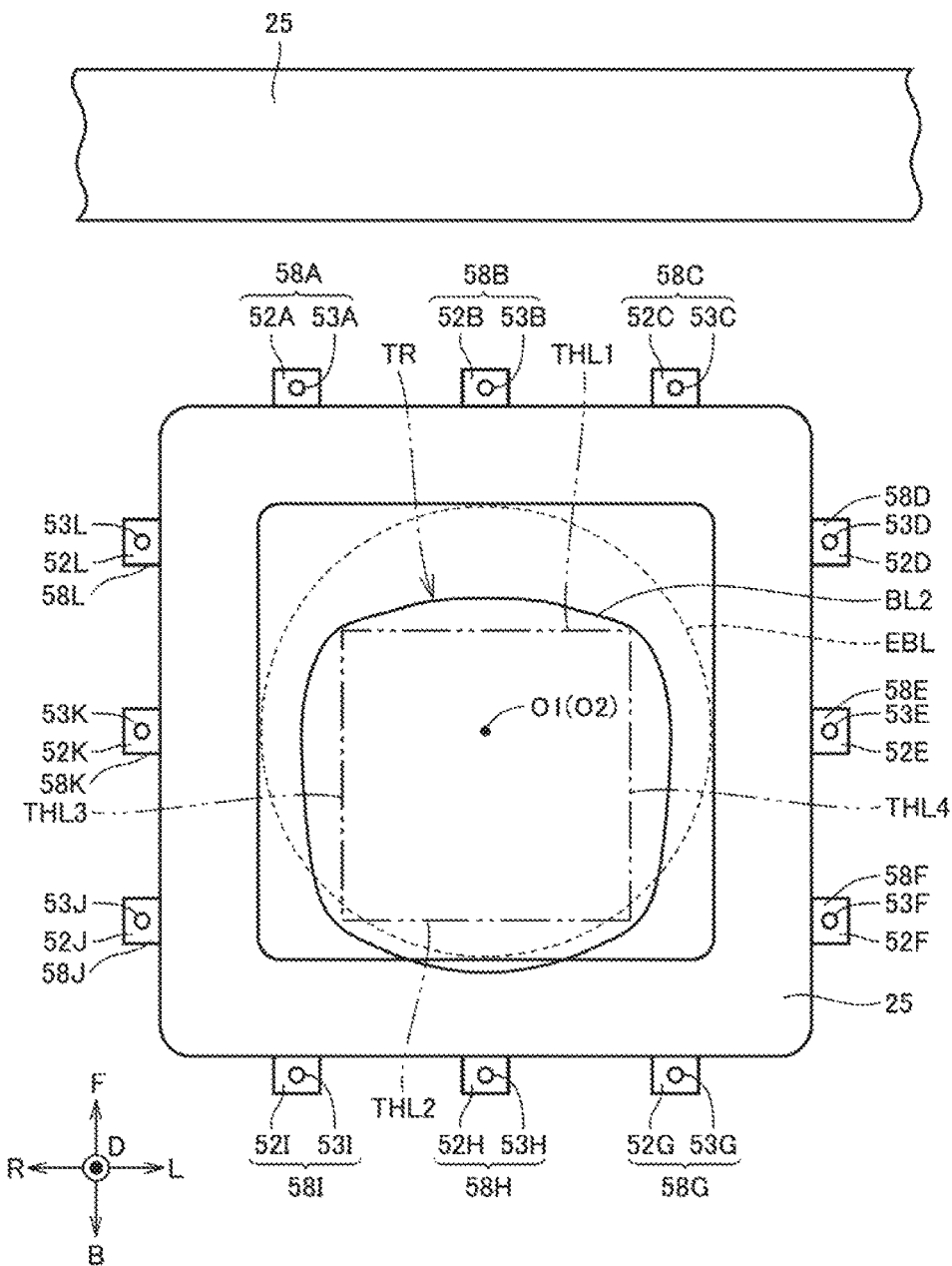
FIG. 38 is a bottom view of power reception coil 11 and power transmission coil 25 when viewed from below the power transmission coil.

In FIG. 38, a boundary BL3 represents the boundary when power reception coil 11 and power transmission coil 25 are vertically apart from each other at a prescribed distance L11. Note that prescribed distance L11 is shorter than prescribed distance L1. Boundary line BL3 is substantially similar in shape to boundary line BL1, and is smaller than boundary line BL1. Because the distance between power reception coil 11 and power transmission coil 25 is shorter, the amount of incoming magnetic flux into floor panel 70 is greater. Therefore, the temperature of each of the members provided on floor panel 70 is more likely to increase.

When the distance between power reception coil 11 and power transmission coil 25 is shorter, the amount of incoming magnetic flux into each of metal pieces 52A to 52L is greater. The size of threshold region TR is thus smaller than that at prescribed distance L1, although each of threshold temperatures TH1, TH2, TH3, and TH4 is not changed. In the example shown in FIG. 38, threshold region TR is located within boundary line BL3.

Note that each of threshold temperatures TH1 to TH4 may be set in accordance with the distance between power reception coil 11 and power transmission coil 25.

In FIG. 36, when power reception coil 11 receives power from power transmission coil 25 in a position where power reception coil 11 is horizontally displaced in forward direction F (first displacement direction) with reference to power transmission coil 25 with power reception coil 11 and power transmission coil 25 being vertically apart from each other, the temperatures of undercovers 71, 73 increase during the period from the start to the completion of battery charging, when the horizontal distance between power reception coil 11 and power transmission coil 25 is LP1 (first distance). On the other hand, when power reception coil 11 is displaced in forward direction F as described above, the temperatures of metal pieces 52A, 52B, and 52C (first metal pieces) arranged on the side of forward direction F (first displacement direction) with reference to power reception coil 11 reach a convergence temperature before undercovers 71, 73 are heated to a high temperature. Thus, the power to be transmitted is reduced when an output value of at least one of temperature sensors 53A, 53B, and 53C provided on metal pieces 52A, 52B, and 52C becomes equal to or higher than threshold temperature TH1 (first prescribed threshold). Reducing the power to be transmitted causes the amount of leakage flux entering floor panel 70 to decrease, so as to prevent the temperature of floor panel 70 from increasing. In this way, the temperatures of undercovers 71, 73 can be prevented from increasing.

When power reception coil 11 receives power from power transmission coil 25 in a position where power reception coil 11 has been horizontally moved in backward direction B (second displacement direction) with reference to power transmission coil 25 with power reception coil 11 and power transmission coil 25 being vertically apart from each other, the temperatures of support members 75A, 75B increase during the period from the start to the completion of battery charging, when the horizontal distance between power reception coil 11 and power transmission coil 25 is LP2 (second distance). On the other hand, the temperatures of metal pieces 52G, 52H, and 52I (second metal pieces) arranged on the side of backward direction B (second displacement direction) relative to power reception coil 11 reach a convergence temperature before the cushion members 93A, 93B are heated to a high temperature. Thus, the power to be transmitted is reduced when an output value of at least one of metal pieces 52G, 52H, and 52I becomes equal to or higher than threshold temperature TH2 (second prescribed threshold). In this way, the temperatures of cushion members 93A, 93B can be prevented from increasing.

Threshold temperature TH2 (second prescribed threshold) is set higher than threshold temperature TH1 (first prescribed threshold). This is because the heat resistance of cushion members 93A, 93B is higher than that of undercovers 71, 73, such that an allowable distance of displacement toward cushion members 93A, 93B relative to power reception coil 11 is longer, and hence, the shape of boundary line BL1 shown in FIG. 36 is longer in backward direction B than in forward direction F. Thus, because threshold temperature TH2 (second prescribed threshold) is set higher than threshold temperature TH1 (first prescribed threshold), charging of the battery is permitted without reducing the power to be transmitted even if power reception coil 11 is displaced significantly in backward direction B relative to power transmission coil 25.

This can ensure a wider region over which high power can be transmitted, as compared to the case where the amount of power to be transmitted is simply reduced as the amount of displacement between power reception coil 11 and power transmission coil 25 increases. This can ensure a wide region that allows charging to be completed in a short period.

In FIG. 36, when power reception coil 11 receives power from power transmission coil 25 in a position where power reception coil 11 has been horizontally moved in right direction R (third displacement direction) with reference to power transmission coil 25 with power reception coil 11 and power transmission coil 25 being vertically apart from each other and when the horizontal distance between power reception coil 11 and power transmission coil 25 is LP3 (third distance), the temperature of fixing member 103a reaches threshold temperature TH3 (third prescribed threshold) during the period from the start to the completion of charging of battery 10. On the other hand, when power reception coil 11 is displaced in right direction R, the temperatures of metal pieces 52J, 52K, and 52L (third metal pieces) arranged on the side of right direction R (third displacement direction) with reference to power reception coil 11 reach a convergence temperature before fixing member 103a is heated to a high temperature.

Thus, the power to be transmitted is reduced when an output value of at least one of temperature sensors 53J, 53K, and 53L becomes equal to or higher than threshold temperature TH3. In this way, the temperature of fixing member 103a can be prevented from increasing.

Threshold temperature TH3 (third prescribed threshold) is set higher than threshold temperature TH1 (first prescribed threshold). This is because the heat resistance of fixing member 103a is higher, such that the shape of boundary line BL1 shown in FIG. 36 is longer in right direction R than in forward direction F. Threshold line THL3 can therefore be set in a position more distant from winding axis O1 as the reference position than threshold line THL1. Charging of battery 10 is permitted without reducing the power to be transmitted even if power reception coil 11 is significantly displaced in right direction R relative to power transmission coil 25.

This also ensures a wide region over which high power can be transmitted in right direction R, which allows charging to be completed in a shorter period, as compared to the case where the amount of power to be transmitted is simply reduced as the amount of displacement between power reception coil 11 and power transmission coil 25 increases.

In power transfer system 1, the power to be transmitted from power transmission coil 25 is reduced when an output value of at least one of temperature sensors 53D, 53E, and 53F becomes equal to or higher than threshold temperature TH4 (fourth prescribed threshold). The power to be transmitted can therefore be reduced before fixing member 101a is heated to a high temperature.

The temperature of threshold temperature TH4 is set higher than threshold temperature TH1. This is because the heat resistance of fixing member 101a is higher, such that the shape of boundary line BL1 shown in FIG. 36 is longer in left direction L than in forward direction F. Thus, because threshold temperature TH4 is set higher than threshold temperature TH1, charging of battery 10 is permitted without reducing the power to be transmitted even if power reception coil 11 is displaced significantly in left direction L relative to power transmission coil 25.

As described above, in contactless charging system 1 according to this embodiment, the temperature detection sensors are arranged in each of forward direction F, backward direction B, left direction L, and right direction R (the plurality of displacement directions) relative to power reception coil 11. The threshold temperature is set lower for those of temperature detection devices 58 arranged in a displacement direction where members having lower heat resistance are arranged.

In this way, the temperatures of the members provided on floor panel 70 of vehicle 2 can be prevented from exceeding the heat-resistant temperatures during the period from the start to the completion of charging, even if power reception coil 11 is displaced relative to power transmission coil 25.

Furthermore, because the distance of displacement toward a member having higher heat resistance can be set longer, a wider region over which high power can be transmitted can be ensured, as compared to that in a system where the power to be transmitted is reduced as the amount of displacement increases.

Because metal pieces 52A to 52L are formed of a metal having a heat conductivity higher than that of floor panel 70, the temperatures of metal pieces 52A to 52L reach the highest temperature more quickly than the temperature of floor panel 70.

Therefore, the temperature of floor panel 70 has not become high yet when the temperature of each of metal pieces 52A to 52L has reached the threshold temperature, and the power to be transmitted can be reduced at this timing. Thus, the power to be transmitted can be reduced at the timing far before the members such as undercover 71 and the like provided on floor panel 70 are heated to high temperatures. In this way, deterioration of the members provided on floor panel 70 can be prevented.

Note that in general, when a current I is passed through a coil having an N number of turns, heating power P for heating a metal arranged near the coil can be expressed by Formula (1):

$$P = k \times (NI)^2 \times \sqrt{(\rho \mu f)} \quad (1)$$

where "k" is the proportionality constant, "$\rho$" is the electrical resistivity of the metal, "$\mu$" is the magnetic permeability of the metal, and "f" is the frequency of the coil current.

Iron has electrical resistivity approximately five times that of aluminum, and has magnetic permeability approximately 5000 times or greater than that of aluminum. The heating power for heating iron, therefore, is far greater than that for heating aluminum, and the amount of heat generated by iron is greater than that generated by aluminum. The highest temperature of iron, therefore, is higher than that of aluminum.

On the other hand, aluminum has a heat conductivity higher than that of iron. Thus, because the highest temperature reached by aluminum is lower than that of iron, and the heat conductivity of aluminum is higher than that of iron, the time required for aluminum to reach the highest temperature is shorter than the time required for iron to reach the highest temperature.

Note that the threshold temperature for each of temperature detection devices 58 has been set based on boundary line BL when undercover 71, fixing member 81, undercover 73, fixing member 85, support members 75A, 75B, fixing member 101, fixing member 103, and the like are arranged as shown in FIG. 7, for example.

The layout of these members and the shape of boundary line BL will naturally vary depending on the vehicle type and the like. Thus, each threshold temperature will be set by deriving boundary line BL1 based on the layout of the members, and setting the threshold temperature in accordance with the shape of the derived boundary line BL1.

In this case also, the threshold temperature may be set higher in a direction where the distance from winding axis O1 to boundary line BL is longer, so as to ensure a wide range over which high power can be transmitted while preventing the temperature of each member from exceeding the heat-resistant temperature.

Furthermore, while the case has been described in this embodiment where floor panel 70 is heated by the magnetic flux entering floor panel 70 from power transmission coil 25, and this heat is transferred to the members on floor panel 70, the embodiments are not limited to this example. For example, the embodiments are also applicable to a case where an electric device is arranged on the lower surface or an upper surface of floor panel 70. Specifically, when this electric device includes a circuit board having a low heat-resistant temperature and a resin case in which the circuit board is accommodated, the temperature of the circuit board is elevated by the magnetic flux from power transmission coil 25 directly entering the circuit board.

Thus, when the circuit board has low heat resistance, the threshold temperature for temperature detection devices 58 provided near this electric device is set low. This allows the circuit board to be protected even if power reception coil 11 is displaced relative to power transmission coil 25.

Furthermore, while the members provided on the lower surface of floor panel 70 have been described in this embodiment, the embodiments are also applicable to members provided on the upper surface of floor panel 70, because the temperatures of various members provided on the upper surface of floor panel 70 are also elevated by the magnetic flux entering floor panel 70 from power transmission coil 25. Note that the members provided on the upper surface of floor panel 70 may include, for example, battery 10.

Power transfer system 1 may additionally include control for controlling the power to be transmitted, based on threshold region TR and power reception efficiency η of power reception coil 11. Specifically, the power transfer may be stopped when power reception efficiency η of power reception coil 11 has decreased below threshold efficiency η1. A value not smaller than 90% and not greater than 98% may be appropriately selected, for example, as threshold efficiency η1. If threshold efficiency η1 is smaller than 90%, charging of battery 10 will require a long time, whereas if threshold efficiency η1 is greater than 98%, the range where the displacement of power reception coil 11 is permitted will be excessively narrow. Preferably, a value within the range not smaller than 94% and not greater than 96% is selected as threshold efficiency η1.

In FIG. 36, an efficiency boundary line EBL represents a position where power reception efficiency η of power reception coil 11 is threshold efficiency η1. When winding axis O2 of power reception coil 11 is located outside and far distant from boundary line BL1, as in a measurement position PX, the temperatures of the members provided on floor panel 70 may exceed the heat-resistant temperatures during charging. On the other hand, because the portion on the side of forward direction F of power reception coil 11 is distant from the portion on the side of forward direction F of power transmission coil 25, the temperature of metal piece 52A may be lower than threshold temperature TH1.

On the other hand, when winding axis O2 of power reception coil 11 is located in measurement position PX, the power transmission may be stopped because power reception efficiency η of power reception coil 11 is below threshold efficiency η1. In this way, the temperatures of the members provided on floor panel 70 can be prevented from exceeding the heat-resistant temperatures, even if power reception coil 11 is displaced significantly relative to power transmission coil 25.

Alternatively, prior to the start of power transmission from power transmission coil 25, a vertical distance between power reception coil 11 and power transmission coil 25 may be calculated based on an output value from vehicle height sensor 19, and then it may be determined whether or not the vertical distance is within the range not smaller than prescribed distance L11 and not greater than prescribed distance L10 shown in FIG. 12.

When the vertical distance between power reception coil 11 and power transmission coil 25 is shorter than prescribed distance L11 or longer than prescribed distance L10, power reception efficiency η decreases below threshold efficiency η1. Thus, if control unit 6 has determined in advance that the vertical distance between power reception coil 11 and power transmission coil 25 is not within this range, power transmission from power transmission coil 25 may not be started.

Figure 39:
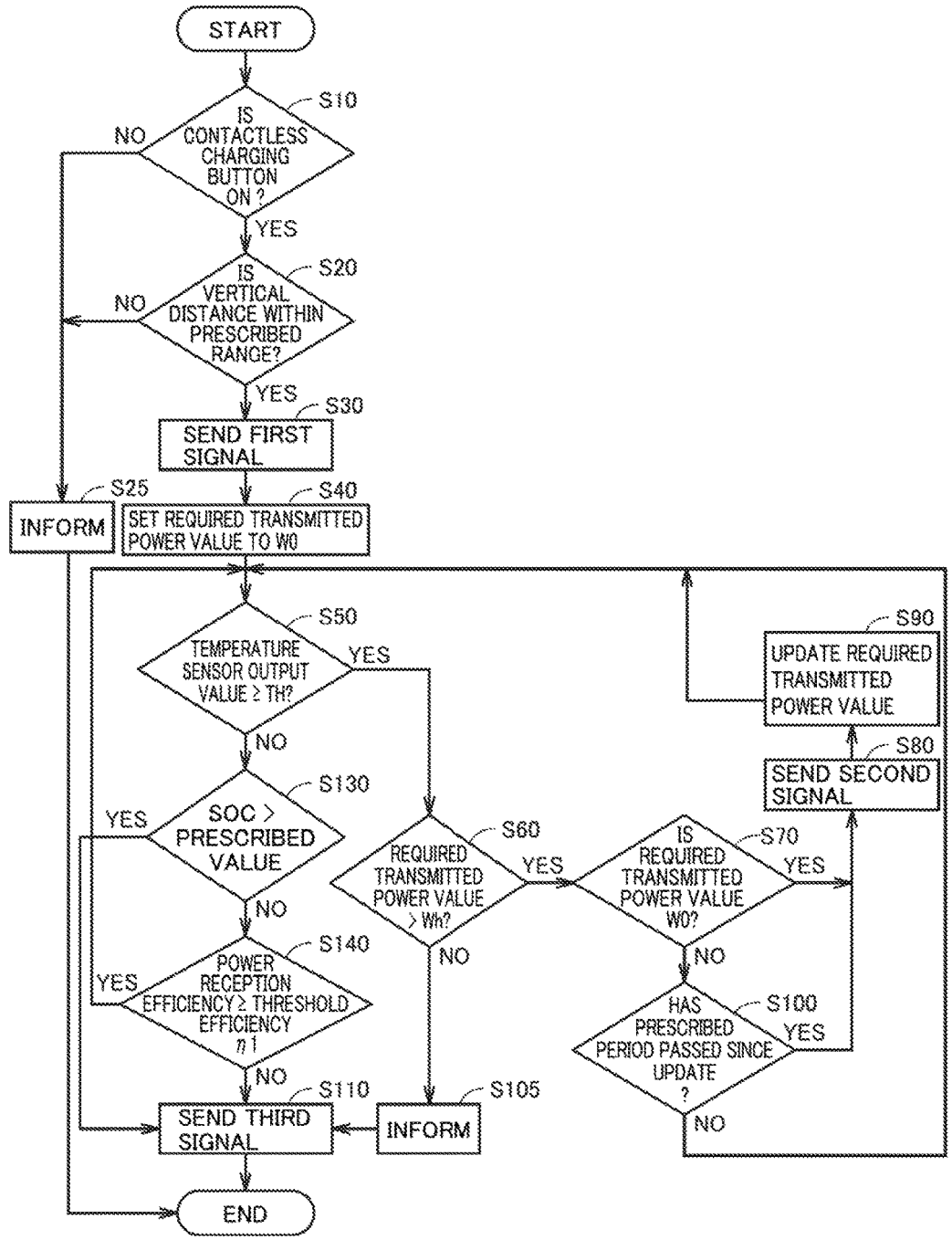
FIG. 39 is a flowchart showing a control flow performed by a control unit 6.

FIG. 39 is a flowchart showing a control flow for power transfer system 1. As shown in FIG. 39, control unit 6 of vehicle 2 determines whether contactless charging button 31 is ON or not when the vehicle is stopped with communication between communication unit 7 and communication unit 29 being established (STEP 10). (STEP is abbreviated as "S" in the drawings.) Where control unit 6 determines that contactless charging button 31 is ON (YES in STEP 10), control unit 6 determines whether or not the vertical distance between power reception coil 11 and power transmission coil 25 is within the prescribed range (STEP 20). Here, control unit 6 calculates the vertical distance between power reception coil 11 and power transmission coil 25 based on the output value from vehicle height sensor 19. Specifically, the height of power transmission coil 25 corresponds substantially to the height of the ground. Thus, the vertical distance between power reception coil 11 and power transmission coil 25 can be calculated based on the output value of vehicle height sensor 19 if the vertical distance between power reception coil 11 and vehicle height sensor 19 has been previously input into a storage unit of control unit 6. Where control unit 6 determines that the distance between power reception coil 11 and power transmission coil 25 is not smaller than prescribed distance L11 and not greater than prescribed distance L10 (YES in STEP 20), control unit 6 sends a first signal to power transmission device 3 via communication unit 7 (STEP 30). Note that where control unit 6 determines that the vertical distance between power reception coil 11 and power transmission coil 25 is not within the prescribed range (NO in STEP 20), it informs the user that charging will not be started (STEP 25). In this way, power transfer with low efficiency can be prevented. Similarly, where contactless charging button 31 is not ON in STEP 10 (NO in STEP 10), control unit 6 informs the user that charging will not be started (STEP25). This is done to confirm the user's intention, although the user is believed to have no intention of charging.

In FIG. 40, control unit 28 of power transmission device 3 waits until it receives the first signal (NO in STEP 35), and after determining that the first signal has been received (YES in STEP 35), control unit 28 sets a target transmitted power value to an initial value W0 (STEP 37).

Control unit 28 then drives frequency converter 27 such that the power to be transmitted from power transmission coil 25 becomes the target transmitted power value (STEP 38). This causes the power having the target transmitted power value to be transmitted to power reception coil 11 from power transmission coil 25.

Here, the power transmitted from power transmission coil 25 can be calculated from current sensor 56 and voltage sensor 57 shown in FIG. 2. Control unit 28 then sends a transmitted power value to vehicle 2 (STEP 39).

In FIG. 39, after sending the first signal, control unit 6 of vehicle 2, updates a required transmitted power value stored in the storage unit of control unit 6 to initial value W0 (STEP 40).

After setting the required transmitted power value to initial value W0, control unit 6 determines whether or not the output value from each of temperature sensors 53A to 53L is equal to or higher than each of threshold temperatures TH1 to TH4 (STEP 50). Specifically, where control unit 6 determines that a detection temperature from any of temperature sensors 53A, 53B, and 53C is equal to or higher than threshold temperature TH1, or a detection temperature from any of temperature sensors 53G, 53H, and 53I is equal to or higher than threshold temperature TH2, or a detection temperature from any of temperature sensors 53J, 53K, and 53L is equal to or higher than threshold temperature TH3, or a detection temperature from any of temperature sensors 53D, 53E, and 53F is equal to or higher than threshold temperature TH4 (YES in STEP 50), control unit 6 determines whether the required transmitted power value stored in the storage unit is equal to or higher than a prescribed value Wh or not (STEP 60).

Where control unit 6 determines that the required transmitted power value stored in the storage unit is greater than prescribed value Wh (YES in STEP 60), control unit 6 determines whether or not the required transmitted power value is initial value W0 (STEP 70). Where control unit 6 determines that the required transmitted power value is initial value W0 (YES in STEP 70), control unit 6 sends a second signal to power reception unit 4 (STEP 80), and updates the required transmitted power value stored in the storage unit of control unit 6 (STEP 90).

Specifically, control unit 6 sets as a new required transmitted power value a value obtained by multiplying the current required transmitted power value by k (k is a constant greater than 0 and smaller than 1).

As described above, because the temperature of any of metal pieces 52A to 52L has exceeded the threshold temperature after the power transmission is started, it is expected that winding axis O2 of power reception coil 11 may be located on the peripheral line of TR or outside threshold region TR shown in FIG. 36.

Continued power transmission may therefore cause any of the plurality of members provided on floor panel 70 to be heated to a high temperature. In particular, when winding axis O2 of power reception coil 11 is located on or outside boundary line BL1, continued power transmission may cause the temperature of any of the members such as floor panel 70 and the like to exceed the heat-resistant temperature. Thus, reducing the power to be transmitted from power transmission coil 25 prevents the temperature of any of the various members provided on floor panel 70 from exceeding the threshold temperature.

Note that because the heat conductivity of metal pieces 52A to 52L is higher than that of floor panel 70, it can be expected that the temperature of floor panel 70 has not become high yet.

In FIG. 40, after receiving the second signal (YES in STEP 85), control unit 28 of power reception unit 4, updates the target transmitted power value (STEP 86). Specifically, control unit 28 sets as a new target transmitted power value a value obtained by multiplying the current target transmitted power value by k (k is a constant greater than 0 and smaller than 1). Alternatively, the second signal sent from control unit 6 of vehicle 2 may contain information about a new target transmitted power value, such that control unit 28 of power reception unit 4 may set a new target transmitted power value based on the information about the new target transmitted power value contained in the received second signal. Control unit 28 then causes frequency converter 27 to be driven such that the power to be transmitted from power transmission coil 25 becomes the target transmitted power value (STEP 38).

In FIG. 39, where control unit 6 of vehicle 2 determines in STEP 70 that the required transmitted power value is not initial value W0, control unit 6 determines whether or not a prescribed period has elapsed since the update of the required transmitted power value (STEP 100). Where control unit 6 determines that the prescribed period has elapsed (YES in STEP 100), control unit 6 sends the second signal to power transmission device 3 (STEP 80). Where control unit 6 determines that the prescribed period has not elapsed (NO in STEP 100), control unit 6 determines again whether or not the output value from each of temperature sensors 53A to 53L has exceeded the threshold value (STEP 50).

Even if the power transmitted from power transmission coil 25 has been reduced after the required transmitted power value is updated, it takes time until the temperature of each of metal pieces 52A to 52L decreases. Thus, once the required transmitted power value is updated, it is not updated until the prescribed period elapses.

Because each of metal pieces 52A to 52L is formed of a metal material having a heat conductivity higher than that of floor panel 70, the temperatures of metal pieces 52A to 52L decrease quickly. This can reduce the prescribed period defined in STEP 100.

Then, where the output value from any of temperature sensors 53A to 53L is still equal to or higher than the threshold temperature after the prescribed period has elapsed, there may be a member among the various members provided on floor panel 70 of which temperature will exceed the heat-resistant temperature even after the power to be transmitted has been updated. In this case, the required transmitted power value is reduced again.

Where control unit 6 of vehicle 2 determines in STEP 60 that the current required transmitted power value is equal to or lower than prescribed value Wh (NO in STEP 60), control unit 6 informs the user that charging has been interrupted (STEP 105). Control unit 6 then sends a third signal to power transmission device 3 (STEP 110).

In FIG. 40, control unit 28 of power transmission device 3 continues the power transmission based on the set target transmitted power value until it receives the third signal (NO in STEP 115). After receiving the third signal (YES in STEP 115), control unit 28 causes the power transmission to stop (STEP 116).

Where the required transmitted power value is equal to or lower than prescribed value When in STEP 60, the required transmitted power value has been updated more than once, and the temperature of any of metal pieces 52A to 52L has remained above the threshold temperature over a certain period of time.

As a result, owing to the possibility that the temperature of floor panel 70 may increase, the power transmission is stopped when required transmitted power value has become equal to or lower than prescribed value Wh. This prevents the temperature of floor panel 70 from increasing, and the temperature of each member provided on floor panel 70 from exceeding the heat-resistant temperature.

Where control unit 6 of vehicle 2 determines that the output value from each of temperature sensors 53A to 53L has not exceeded the threshold temperature (NO in STEP 50), control unit 6 determines whether or not the SOC of battery 10 is greater than a prescribed value (STEP 130).

Where control unit 6 determines that the SOC of battery 10 is greater than the prescribed value (YES in STEP 130), control unit 6 of vehicle 2 sends the third signal (STEP 110). When the SOC is greater than the prescribed value, control unit 6 determines that the charging is completed, and stops the power transmission from power transmission device 3 to end the charging.

Where control unit 6 determines that the SOC is equal to or lower than the prescribed value (NO in STEP 110), control unit 6 determines whether or not power reception efficiency η of power reception coil 11 is equal to or higher than threshold efficiency η1 (STEP 140). Here, control unit 28 of power transmission device 3 shown in FIG. 1 sends the transmitted power value to control unit 6 via communication unit 29. Control unit 6 calculates received power by multiplying the current value detected by current sensor 56 shown in FIG. 2 by the voltage value detected by voltage sensor 57.

Control unit 6 then calculates the above-described power reception efficiency η by dividing the calculated received power value by the transmitted power value. Then, where control unit 6 determines that power reception efficiency η is smaller than threshold efficiency η1 (NO in STEP 140), control unit 6 sends the third signal to power transmission device 3 (STEP 110). On the other hand, where control unit 6 determines that power reception efficiency η of power reception coil 11 is equal to or higher than threshold efficiency η1, control unit 6 monitors the output value from each temperature sensor (STEP 50).

While the plurality of metal pieces 52A to 52C are arranged on the side of forward direction F relative to power reception coil 11 in power transfer system 1 according to this embodiment, metal piece 52A may be arranged alone. Similarly, metal piece 52H may be arranged alone on the side of backward direction B relative to power reception coil 11, and metal piece 52K may be arranged alone on the side of right direction R relative to power reception coil 11. Similarly, metal piece 52E may be arranged alone on the side of left direction L relative to power reception coil 11.

While embodiments have been described as above, it should be understood that the embodiments disclosed herein are illustrative and non-restrictive in every respect.

What is claimed is:

1. A power transfer system comprising:
   a power reception coil provided on a bottom surface of a vehicle;
   a power transmission coil that contactlessly transmits power to the power reception coil;
   a plurality of members mounted along the bottom surface of the vehicle around the power reception coil;
   a plurality of temperature detectors, each of which detects a detection temperature that increases as a temperature of each of the plurality of members increases; and
   a controller that causes the power to be transmitted from the power transmission coil to decrease when the detection temperature detected by any of the plurality of temperature detectors is equal to or higher than a prescribed threshold, wherein
   at least one of the plurality of members is a heated member that increases in temperature by magnetic flux emitted from the power transmission coil,
   the heated member is located in a displacement direction spaced from an axis of the power reception coil,
   the plurality of temperature detectors are arranged in a plurality of positions around the axis of the power reception coil, and
   a value of the prescribed threshold is set lower for a temperature detector associated with the heated member having lower heat resistance than for a temperature detector associated with one of the plurality of members other than the heated member and having a higher heat resistance than the heated member.

2. The power transfer system according to claim 1, further comprising:
   a first current sensor that detects a current flowing through the power transmission coil;
   a first voltage sensor that detects a voltage applied to the power transmission coil;
   a second current sensor that detects a current flowing through the power reception coil; and
   a second voltage sensor that detects a voltage applied to the power reception coil, wherein
   the controller (i) calculates a transmitted power value from a first current value detected by the first current sensor and a first voltage value detected by the first voltage sensor, (ii) calculates a received power value from a second current value detected by the second current sensor and a second voltage value detected by the second voltage sensor, (iii) calculates a power reception efficiency by dividing the received power value by the transmitted power value, and (iv) stops the power transmission from the power transmission coil when the power reception efficiency is equal to or lower than a prescribed efficiency value that is not smaller than 90% and not greater than 98%.

3. The power transfer system according to claim 1, further comprising:
   a floor panel arranged on the bottom surface of the vehicle; and
   a case in which the power reception coil is accommodated, wherein
   the plurality of members are attached to the floor panel and arranged outside the case, and
   the plurality of temperature detectors are accommodated within the case.

4. The power transfer system according to claim 1, further comprising:
   a floor panel arranged on the bottom surface of the vehicle, wherein
   the plurality of members are attached to the floor panel,
   each of the plurality of temperature detectors includes a metal piece and a temperature sensor that measures a temperature of the metal piece, and
   each of the metal pieces has a heat conductivity higher than a heat conductivity of the floor panel.

5. The power transfer system according to claim 1, further comprising:
   a floor panel arranged on the bottom surface of the vehicle;
   an undercover made of resin and provided on the floor panel, and
   a plurality of fixing members that fixes the undercover to the floor panel;
   an engine provided in the vehicle;
   an exhaust unit connected to the engine; and
   a support member that is connected to the floor panel and supports the exhaust unit, wherein
   the undercover includes a plurality of contact portions that is brought into contact with the floor panel using the plurality of fixing members,
   a first one of the plurality of contact portions closest to the power reception coil is located on a forward side of the vehicle relative to the power reception coil,
   the support member includes a cushion member made of resin, the cushion member is located on a backward side of the vehicle relative to the power reception coil, and the prescribed threshold for a first one of the plurality of temperature detectors arranged on the forward side of the vehicle relative to the power reception coil is lower than the prescribed threshold for a second one of the temperature detectors arranged on the backward side of the vehicle relative to the power reception coil.

6. A power transfer system comprising:

a floor panel arranged on a bottom surface of a vehicle;

a power reception device including a power reception coil and provided on a lower surface of the floor panel;

a power transmission device including a power transmission coil that contactlessly transmits power to the power reception coil;

a battery configured to be charged with the power received by the power reception device;

a plurality of members provided on the floor panel;

a plurality of temperature detectors, a detection temperature of each of the plurality of temperature detectors increasing as a temperature of each of the plurality of members increases; and a controller configured to decrease the power to be transmitted from the power transmission coil when the detection temperature detected by any of the plurality of temperature detectors is equal to or higher than a prescribed threshold, wherein when the power is transmitted from the power transmission coil to the power reception coil with a central axis of the power reception coil being displaced horizontally in a first direction relative to a central axis of the power transmission coil, a temperature of at least a first one of the plurality of members exceeds a heat-resistant temperature during a period from start to completion of charging of the battery when an amount of horizontal displacement in the first horizontal direction is equal to or higher than a first distance, when the power is transmitted from the power transmission coil to the power reception coil with the central axis of the power reception coil being displaced in a second horizontal direction relative to the central axis of the power transmission coil, a temperature of at least a second one of the plurality of members exceeds a heat-resistant temperature during the period from the start to the completion of charging of the battery when the amount of the horizontal displacement in the second horizontal direction is equal to or higher than a second distance longer than the first distance, the plurality of temperature detectors includes a first temperature detector arranged on a side toward the first horizontal direction of the power reception coil and a second temperature detector arranged on a side toward the second horizontal direction of the power reception coil, the controller is configured to decrease the power to be transmitted from the power transmission coil when a detection temperature of the first temperature detector is equal to or higher than a first temperature, and is configured to decrease the power to be transmitted when a detection temperature of the second temperature detector is equal to or higher than a second temperature, and the first temperature is lower than the second temperature.

* * * * *